(12) United States Patent
Sendai et al.

(10) Patent No.: US 10,423,702 B2
(45) Date of Patent: Sep. 24, 2019

(54) CHARACTER INPUT DEVICE AND NON-TRANSITORY COMPUTER-READABLE RECORDING MEDIUM FOR CHARACTER INPUT

(71) Applicant: FUJITSU LIMITED, Kawasaki-shi, Kanagawa (JP)

(72) Inventors: Shimpei Sendai, Bunkyo (JP); Toru Kohei, Kawasaki (JP)

(73) Assignee: FUJITSU CONNECTED TECHNOLOGIES LIMITED, Kawasaki (JP)

(*) Notice: Subject to any disclaimer, the term of this patent is extended or adjusted under 35 U.S.C. 154(b) by 0 days.

(21) Appl. No.: 15/438,706

(22) Filed: Feb. 21, 2017

(65) Prior Publication Data

US 2017/0255598 A1    Sep. 7, 2017

(30) Foreign Application Priority Data

Mar. 3, 2016   (JP) .................................. 2016-041478

(51) Int. Cl.
*G06F 17/28*    (2006.01)
*G06F 17/22*    (2006.01)
(Continued)

(52) U.S. Cl.
CPC ........ *G06F 17/2223* (2013.01); *G06F 3/0482* (2013.01); *G06F 3/04883* (2013.01);
(Continued)

(58) Field of Classification Search
CPC .... G06F 3/018; G06F 17/2223; G06F 17/276; G06F 3/0236; G06F 17/2735;
(Continued)

(56) References Cited

U.S. PATENT DOCUMENTS 5,802,381 A  *  9/1998  Matsumoto ............. G06F 17/24
                                                     715/202
6,002,390 A     12/1999 Masui
(Continued)

FOREIGN PATENT DOCUMENTS

JP    H9-146688 A    6/1997
JP    10-154144      6/1998
(Continued)

OTHER PUBLICATIONS

Office Action dated Jul. 9, 2019, issued in counterpart JP application No. 2016-041478, with English translation. (6 pages).

*Primary Examiner* — Vijay B Chawan
(74) *Attorney, Agent, or Firm* — Westerman, Hattori, Daniels & Adrian, LLP

(57) ABSTRACT

A character input device includes a memory that stores one or more conversion candidates, and a processor that executes a process including receiving input of a first character of a word and the number of characters of the word, extracting a conversion candidate including the first character from the one or more conversion candidates stored in the memory according to the number of characters of the word, and displaying the extracted conversion candidate.

10 Claims, 20 Drawing Sheets

(51) Int. Cl.
*G10L 15/18* (2013.01)
*G06K 9/00* (2006.01)
*G06F 3/0482* (2013.01)
*G06F 3/0488* (2013.01)
*G10L 15/26* (2006.01)

(52) U.S. Cl.
CPC ..... *G06F 17/2863* (2013.01); *G06K 9/00268* (2013.01); *G10L 15/1815* (2013.01); *G10L 15/26* (2013.01)

(58) Field of Classification Search
CPC ............ G06F 17/3061; G06F 17/3064; G06F 17/30684; G06F 17/30985; G06F 3/0233; G06F 17/2276; G06F 17/2881; G10L 15/1815; G10L 15/26; G10L 13/00; G10L 21/04; H04M 2201/40; H04M 2250/74; H04M 3/4938; H04M 2250/58; G06K 2209/01; G06K 9/00268; G06K 9/726; H04N 21/41407; H04N 21/4316; H04N 21/4856; H04N 5/44591
USPC ..... 704/10, 251, 2, 231, 242, 255, 260, 270, 704/3, 8; 707/769, 999.005, 999.107; 710/67; 715/259, 811, 202, 236, 257, 715/262, 264, 277, 810; 341/22, 28; 382/118, 185; 455/556.1, 565
See application file for complete search history.

(56) References Cited

U.S. PATENT DOCUMENTS

| | | | | |
|---|---|---|---|---|
| 6,636,162 | B1* | 10/2003 | Kushler | G06F 3/018 341/22 |
| 7,165,021 | B2* | 1/2007 | Sugano | G06F 3/018 704/2 |
| 8,107,731 | B2* | 1/2012 | Okumura | G06F 17/2863 382/185 |
| 8,126,712 | B2* | 2/2012 | Mukaigaito | G10L 15/1815 704/231 |
| 8,140,722 | B2* | 3/2012 | Ikeda | G06F 3/0237 455/565 |
| 9,087,118 | B2* | 7/2015 | Kataoka | G06F 17/30011 |
| 9,552,351 | B2* | 1/2017 | Ueda | G06F 17/30684 |
| 2003/0061031 | A1* | 3/2003 | Kida | G06F 17/2863 704/10 |
| 2003/0233615 | A1* | 12/2003 | Morimoto | G06F 3/018 715/259 |
| 2005/0182794 | A1* | 8/2005 | Masui | G06F 17/2223 |
| 2008/0300012 | A1* | 12/2008 | An | G06F 17/2276 455/556.1 |
| 2008/0310724 | A1* | 12/2008 | Okumura | G06F 17/2863 715/256 |
| 2009/0018832 | A1* | 1/2009 | Mukaigaito | G10L 15/1815 704/251 |
| 2009/0327284 | A1* | 12/2009 | Kataoka | G06F 17/3061 |
| 2011/0040908 | A1* | 2/2011 | Ikeda | G06F 3/0237 710/67 |
| 2011/0090151 | A1 | 4/2011 | Huang et al. | |
| 2013/0204891 | A1 | 8/2013 | Maw | |
| 2014/0348400 | A1* | 11/2014 | Ohta | G06K 9/00268 382/118 |
| 2015/0261741 | A1* | 9/2015 | Ueda | G06F 17/30684 704/10 |

FOREIGN PATENT DOCUMENTS

| | | |
|---|---|---|
| JP | 2006-236201 A | 9/2006 |
| JP | 2010-277276 A | 12/2010 |
| JP | 2015-028784 | 2/2015 |
| KR | 10-2015-0043195 A | 4/2015 |

* cited by examiner

FIG.4

| WORD | PRONUNCIATION | FIRST CHARACTER | NUMBER OF CHARACTERS | NUMBER OF TIMES SELECTED |
|---|---|---|---|---|
| あ | あ | あ | 1 | 70 |
| 足 | あし | あ | 1 | 22 |
| 亜 | あ | あ | 1 | 28 |
| 阿 | あ | あ | 1 | 92 |
| ああ | ああ | あ | 2 | 1 |
| 嗚呼 | ああ | あ | 2 | 69 |
| アーキテクチャー | あーきてくちゃー | あ | 8 | 2 |
| アーク | あーく | あ | 3 | 2 |
| アーク溶接 | あーくようせつ | あ | 7 | 0 |
| アース | あーす | あ | 3 | 3 |
| アーチ | あーち | あ | 3 | 1 |
| アーチェリー | あーちぇりー | あ | 6 | 5 |

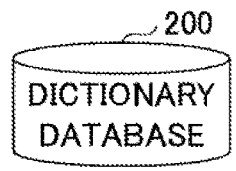

DICTIONARY DATABASE — 200

EXTRACT DICTIONARY DATA OF FIRST CHARACTER "お", NUMBER OF CHARACTERS "4"

| WORD | PRONUNCIATION | FIRST CHARACTER | NUMBER OF CHARACTERS | NUMBER OF TIMES SELECTED |
|---|---|---|---|---|
| おいしい | おいしい | お | 4 | 65 |
| 美味しい | おいしい | お | 4 | 62 |
| お帰り | おかえり | お | 4 | 6 |
| 行う | おこなう | お | 4 | 56 |
| おはよう | おはよう | お | 4 | 87 |
| ... | ... | ... | ... | ... |

ALIGN NUMBER OF TIMES SELECTED IN DESCENDING ORDER

| WORD | PRONUNCIATION | FIRST CHARACTER | NUMBER OF CHARACTERS | NUMBER OF TIMES SELECTED |
|---|---|---|---|---|
| おはよう | おはよう | お | 4 | 87 |
| お早う | おはよう | お | 4 | 71 |
| おいしい | おいしい | お | 4 | 65 |
| 美味しい | おいしい | お | 4 | 62 |
| 行う | おこなう | お | 4 | 56 |
| 追い越し | おいこし | お | 4 | 51 |
| ... | ... | ... | ... | ... |

FIG.13

| WORD | PRONUNCIATION | FIRST CHARACTER | LAST CHARACTER | NUMBER OF CHARACTERS | NUMBER OF TIMES SELECTED 220A |
|---|---|---|---|---|---|
| あ | あ | あ | あ | 1 | 70 |
| 足 | あ | あ | あ | 1 | 22 |
| 亜 | あ | あ | あ | 1 | 28 |
| 阿 | あ | あ | あ | 1 | 92 |
| ああ | ああ | あ | あ | 2 | 1 |
| 嗚呼 | ああ | あ | あ | 2 | 69 |
| アーキテクチャー | あーきてくちゃー | あ | ー | 8 | 2 |
| アーク | あーく | あ | く | 3 | 2 |
| アーク溶接 | あーくようせつ | あ | つ | 7 | 0 |
| アース | あーす | あ | す | 3 | 3 |
| アーチ | あーち | あ | ち | 3 | 1 |
| アーチェリー | あーちぇりー | あ | ー | 6 | 5 |

# CHARACTER INPUT DEVICE AND NON-TRANSITORY COMPUTER-READABLE RECORDING MEDIUM FOR CHARACTER INPUT

CROSS-REFERENCE TO RELATED APPLICATIONS

This application is based upon and claims the benefit of priority of the prior Japanese Patent Application No. 2016-041478 filed on Mar. 3, 2016, the entire contents of which are incorporated herein by reference.

FIELD

The embodiments discussed herein are related to a character input device and a non-transitory computer-readable recording medium for character input.

BACKGROUND

Characters are input to portable type terminal devices such as smartphones by way of, for example, a software keyboard or handwritten input.

For example, characters may be input with a software keyboard in which a user inputs a character string indicating the pronunciation of a desired word or the like and selects the desired word from a list of conversion candidates based on the input character string (see, for example, Japanese Laid-Open Patent Publication No. 10-154144).

Wearable type terminal devices such as smartwatches tend to have smaller display screens compared to the display screens of smartphones or the like. Therefore, wearable type terminal devices tend to have low character input efficiency.

Thus, in a case where a terminal device has a small character input area due to a small display screen, the user may have difficulty in inputting a character string indicating the pronunciation of a desired word into the character input area. Accordingly, the user may input an erroneous character (erroneous input). This may lead to reduction of character input speed and degradation of character input efficiency.

SUMMARY

According to an aspect of the invention, there is provided a character input device including a memory that stores one or more conversion candidates, and a processor that executes a process including receiving input of a first character of a word and the number of characters of the word, extracting a conversion candidate including the first character from the one or more conversion candidates stored in the memory according to the number of characters of the word, and displaying the extracted conversion candidate.

The object and advantages of the invention will be realized and attained by means of the elements and combinations particularly pointed out in the claims.

It is to be understood that both the foregoing general description and the followed detailed description are exemplary and explanatory and are not restrictive of the invention, as claimed.

BRIEF DESCRIPTION OF DRAWINGS

FIG. 4 is a schematic diagram illustrating a configuration of a dictionary database according to the first embodiment of the present invention;

FIG. 8 is a schematic diagram illustrating an example of extracting dictionary data and aligning dictionary data;

FIG. 13 is a schematic diagram illustrating a configuration of a dictionary database according to the second embodiment of the present invention;

DESCRIPTION OF EMBODIMENTS

Next, embodiments of the present invention are described with reference to the accompanying drawings.

First Embodiment

First, an entire configuration of a terminal device 10 of the first embodiment is described with reference to FIG. 1. FIG.

1 is a schematic diagram illustrating the entire configuration of the terminal device 10 of the first embodiment.

Figure 1:
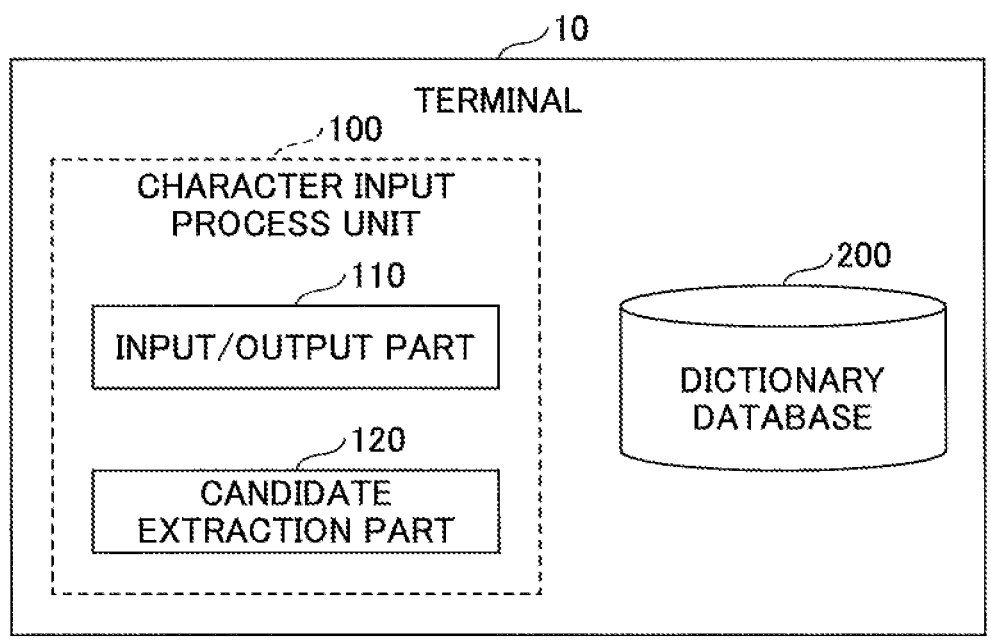
FIG. 1 is a schematic diagram illustrating an entire configuration of a terminal device according to the first embodiment of the present invention.

The terminal device 10 illustrated in FIG. 1 is a wearable terminal (e.g., smartwatch) having a touch panel. The terminal device 10 includes a character input process unit 100 and a dictionary database (hereinafter referred to as "dictionary DB") 200.

The character input process unit 100 that performs a character input process includes an input/output part 110 and a candidate extraction part 120. According to the character input process of the first embodiment, a user performs an operation of inputting a first character of a word desired to be input by the user (first character input operation) and an operation of inputting the number of characters of the word (character number input operation). When the input/output part 110 receives the first character input operation and the character number input operation, the candidate extraction part 120 extracts dictionary data from the dictionary DB 20 based on the first character and the number of characters that are input. The extracted dictionary data includes one or more words that is are candidates for converting the first character (conversion candidates). Then, the input/output part 110 displays a list of words included in the extracted dictionary data as conversion candidates. Thus, according to the terminal device 10 of the first embodiment, a user can select a desired conversion candidate from the list of conversion candidates displayed on the touch panel, so that the first character is converted into the conversion candidate selected by the user. That is, according to the terminal device 10 of the first embodiment, a word corresponding to a selected conversion candidate can be input when the user selects a single conversion candidate from the list of conversion candidates.

Note that the term "conversion candidate" refers to a word included in dictionary data extracted from the dictionary DB 20 based on the first character and the number of characters. Further, the term "word" not only includes a word but also a phrase, a clause, or a sentence that is expressed with one or more characters.

The dictionary DB 200 is a database stored with dictionary data including words that are to be conversion candidates. Note that the dictionary DB 200 stores the dictionary data in units of words that are conversion candidates.

Figure 2:
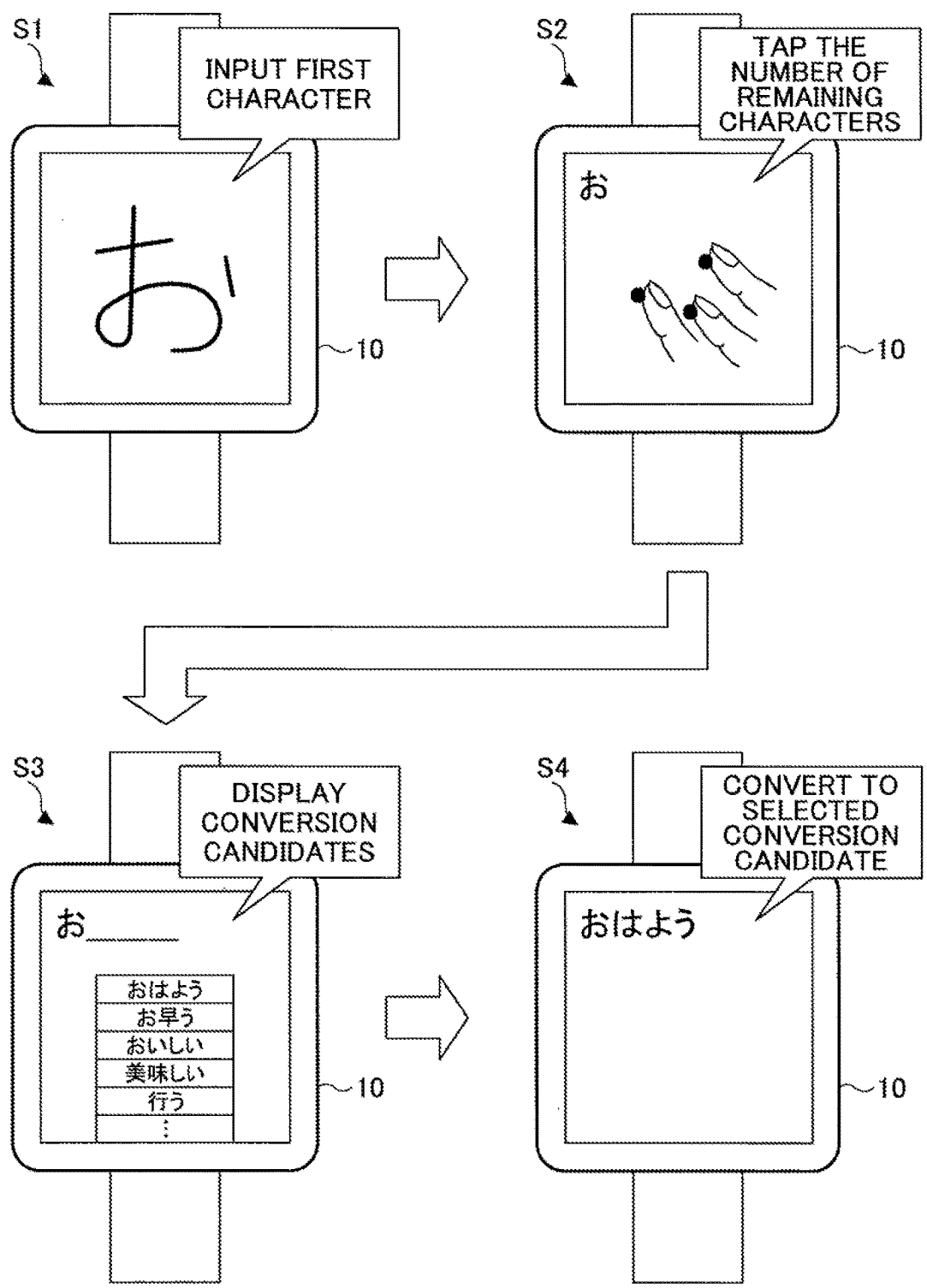
FIG. 2 is a schematic diagram for describing a character input process according to the first embodiment of the present invention.

Next, a character input process of the first embodiment is described with reference to FIG. 2. FIG. 2 is a schematic diagram for describing the character input process of the first embodiment. The example of FIG. 2 is a case where the user desires to input a Japanese word "おはよう (O-HA-YO-U)".

First, the terminal device 10 receives input of a first character by way of the input/output part 110 (Step S1). That is, the user performs an input operation on the input/output part 110 by which the first character "お (O)" of the word "おはよう (O-HA-YO-U)" desired to be input is received. Note that the user may input the first character, for example, by hand.

Then, the terminal device 10 receives the input of the number of characters by way of the input/output part 110 (Step S2). In the first embodiment, the character number input operation is assumed to be a tapping operation. Therefore, each time the user performs a tapping operation on the terminal device 10, the input/output part 110 assumes that the tapping operation is an input operation corresponding to the number of characters.

In this embodiment, the number of taps by the user may be the number of characters excluding the first character of the word desired to be input. That is, the user may tap the terminal device 10 in a number equivalent to the remaining number of characters excluding the first character "お (O)" from the word "おはよう (O-HA-YO-U)" (i.e., three characters "は (HA)", "よ (YO)", and "う (U)").

Then, the terminal device 10 extracts, by way of the candidate extraction part 120, dictionary data from the dictionary DB based on the first character and the number of characters. Then, the terminal device 10 displays, by way of the input/output part 110, a list of conversion candidates indicating the words included in the extracted dictionary data (Step S3).

That is, the candidate extraction part 120 extracts dictionary data including a word having the character "お (O)" as its first character and consisting of four characters. Then, the input/output part 110 displays a list of conversion candidates including the words included in the extracted dictionary data. The reason that the number of characters is "four" is because the number of tapping operations performed on the terminal device 10 after the input of the first character "お (O)" is three times (input operations performed in a number equivalent to three characters).

Finally, the input/output part 110 of the terminal device 10 converts the first character into a conversion candidate selected from the list of conversion candidates by the user (Step S4). Accordingly, when the user selects the conversion candidate "お は よ う (O-HA-YO-U)" from the list of conversion candidates, the word "おはよう (O-HA-YO-U)" is displayed on the terminal device 10. That is, the word "おはよう (O-HA-YO-U)" is input to the terminal device 10.

Hence, according to the terminal device 10 of the first embodiment, the list of conversion candidates is displayed based on the first character of the word desired to be input by the user and the number of characters of the desired word. That is, the user of the terminal device 10 of the first embodiment allows the display of the list of conversion candidates by inputting the first character of the desired word and tapping the terminal device 10 in a number equivalent to the number of characters excluding the first character.

Therefore, according to the terminal device 10 of the first embodiment, a desired word can be input with few character input operations. Accordingly, the probability of the user erroneously inputting characters can be reduced and the efficiency of character input can be improved by using the terminal device 10 of the first embodiment. For the sake of convenience, the list of conversion candidates are displayed after the first character input operation and the character number input operation according to the example illustrated in FIG. 2. It is, however, to be noted that the list of conversion candidates may be displayed each time the first character input operation or the character number input operation is performed as described below.

Note that the character number input operation is not limited to the tapping operation illustrated in FIG. 2. For example, an operating of inputting a numeral indicating the number of characters may be performed as the character number input operation. That is, in a case where the user desires to input the word "おはよう (O-HA-YO-U)", the user is to input the first character "お (O)" and the numeral "4" indicating the number of characters.

In the above-described embodiment, the tapping operation is performed in a number equivalent to the number of characters excluding the first character of the word desired to be input by the user. However, the tapping operation may be performed in a number equivalent to the total number of characters of the word desired to be input by the user. That is, in a case where the user desires to input the word "おはよう (O-HA-YO-U)", the user may perform the tapping operation in a number equivalent to the total number of characters of the desired word (i.e., four times) after inputting the first character "お (O)".

Figure 3:
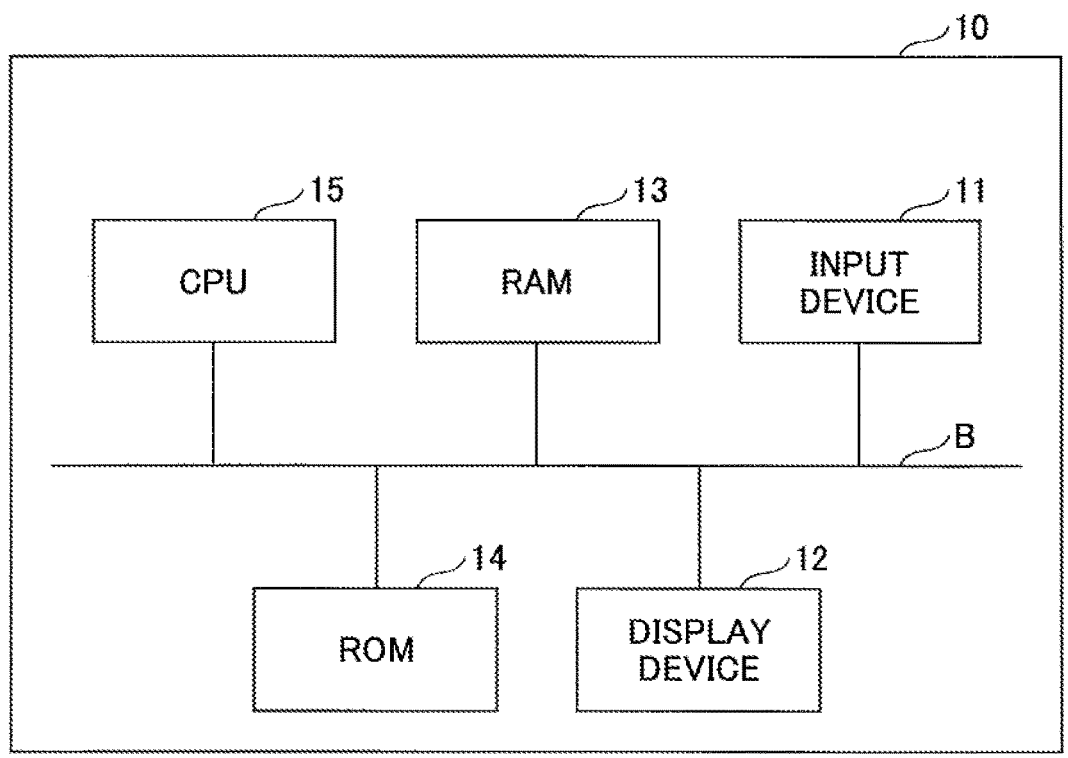
FIG. 3 is a schematic diagram illustrating a hardware configuration of the terminal device according to the first embodiment of the present invention.

Next, a hardware configuration of the terminal device 10 of the first embodiment is described with reference to FIG. 3. FIG. 3 is a schematic diagram illustrating a hardware configuration of the terminal device 10 of the first embodiment.

The terminal device 10 illustrated in FIG. 3 includes an input device 11, a display device 12, a RAM (Random Access Memory) 13, a ROM (Read-Only Memory) 14, and a CPU (Central Processing Unit) 15. Further, the hardware of the terminal device 10 are connected to each other by a bus B.

The input device 11 is a touch panel or the like. The input device 11 is used for inputting various operations such as the character input operation. The display device 12 is, for example, a display. The display device 12 displays the results of various processes of the terminal device 10 such as the list of conversion candidates.

The RAM 13 is a volatile semiconductor memory that temporarily stores program and data. The ROM 14 is a non-volatile semiconductor memory (e.g., Flash ROM) that can store data even when the electric power of the terminal device 10 is turned off.

The CPU 15 is an arithmetic device that reads out programs and data stored in, for example, the ROM 14, loads the programs and data, and executes various processes of the terminal device 10 based on the programs and data.

The terminal device 10 of the first embodiment implements the below-described various processes by using the hardware configuration illustrated in FIG. 3.

Next, a data configuration of the dictionary data stored in the dictionary DB 200 of the first embodiment is described with reference to FIG. 4. FIG. 4 is a schematic diagram illustrating the data configuration of the dictionary DB 200 of the first embodiment. Note that the dictionary DB 200 can be implemented by using, for example, the ROM 14.

As illustrated in FIG. 4, the dictionary data stored in the dictionary DB 200 includes items such as, "word", "pronunciation", "first character", "number of characters", and "number of times selected". That is, the dictionary DB 200 stores dictionary data in association with each of these items.

The item "word" is a word that is a conversion candidate and is expressed with one or more characters. The item "pronunciation" expresses the "word" in, for example, Japanese Hiragana characters. The item "first character" is a first character of the "pronunciation". The item "number of characters" is the number of characters of the "pronunciation". The item "number of times selected" is the number of times in which the "word" is converted into a word included in the dictionary data. That is, the number of times in which a word is selected from the list of conversion candidates and input as the selected conversion candidate.

Although the dictionary DB 200 of FIG. 4 has words stored in the form of Japanese Hiragana characters, Japanese Katakana characters, Chinese characters, or a combination thereof, the dictionary DB 200 may also store words in other forms. For example, words expressed in various characters (e.g., Roman characters, numerals, Japanese Hiragana characters, Japanese Katakana characters, Chinese characters, or a combination thereof) may also be stored in the dictionary DB 200.

In the data item "number of characters" of the dictionary DB 200 illustrated FIG. 4, the symbol "-" (i.e., macron or prolonged sound mark) included in the data item "pronunciation" is counted as a character that is equivalent to a single character. However, a word in the pronunciation may be counted without counting the symbol "-" (i.e., macron or prolonged sound mark) as a character equivalent to a single character. Similarly, a word in the pronunciation may be counted without counting a character of a contracted sound or a double consonant as a character equivalent to a single character.

Further, in a case where the data item "pronunciation" includes a sonant mark (voiced sound symbol) or a p-sound consonant mark (semi-voiced sound symbol), the sonant mark and the p-sound consonant mark may be counted as a character equivalent to a single character. For example, each of the characters "だ (DA)" and "ぱ (PA)" may be counted as characters equivalent to two characters.

Further, in the dictionary DB 200 illustrated FIG. 4, the data item "first character" and the data item "number of characters" indicate the first character of the data item "pronunciation" and the number of characters of the data item "pronunciation", respectively. However, the data item "first character" and the data item "number of characters" may indicate the first character of the data item "word" and the number of characters of the data item "word", respectively. In this case, the data item "pronunciation" need not be included in the dictionary DB 200.

Figure 5:
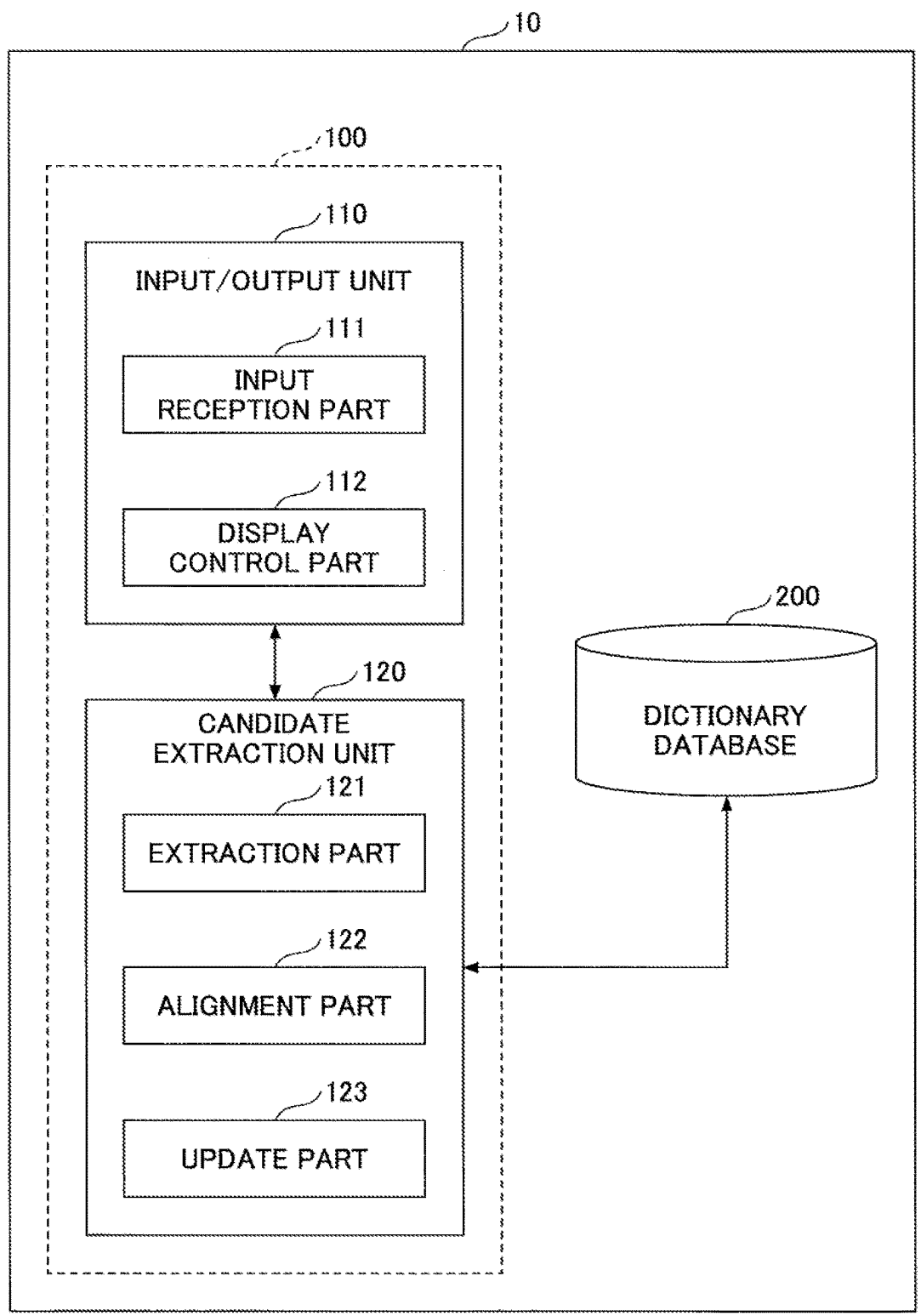
FIG. 5 is a schematic diagram illustrating a functional configuration of a character input process unit according to the first embodiment of the present invention.

Next, a functional configuration of the character input process unit 100 of the first embodiment is described in detail with reference to FIG. 5. FIG. 5 is a schematic diagram illustrating the functional configuration of the character input process unit 100 of the first embodiment. Note that the functions (functional parts) of the character input process unit 100 are implemented by the CPU 15 that executes the processes according to the one or more programs installed in the terminal device 10.

As illustrated in FIG. 5, the character input process unit 100 includes an input/output part 110 and a candidate extraction unit 120. The input/output part 110 receives various operations performed on the terminal device 10 by the user and displays various process results on the display device 12. Note that the input/output part 110 includes an input reception part 111 and a display control part 112.

Further, the candidate extraction unit 120 extracts dictionary data to be used for displaying the list of conversion candidates and sorts the extracted dictionary data in a predetermined order. Note that the candidate extraction unit 120 includes an extraction part 121, an alignment part 122, and a update part 123.

The input reception part 111 receives various operations performed on the terminal device 10 by the user and obtains input information. For example, when the input reception part 111 receives an operation of inputting (input operation) a first character, the input reception part 111 obtains information of the character (character information) input by the input operation. Further, when the input reception part 111 receives a tapping operation (operation of inputting the number of characters), the input reception part 111 obtains information indicating that the tapping operation is performed (tapping information).

The display control part 112 displays various process results on the display device 12. For example, the display control part 112 displays words included in the dictionary data aligned by the alignment part 122 (described in detail below). The words displayed by the display control part 112 are displayed as conversion candidates.

The extraction part 121 extracts dictionary data from the dictionary DB 200 based on the input information obtained by the input reception part 111. That is, the extraction part 121 extracts, from the dictionary DB 200, dictionary data including the first character indicated by the character information obtained from the input reception part 111 and the number of characters (character number) indicating the number of times of obtaining the input information from the input reception part 111.

The alignment part 122 aligns (sorts) the dictionary data extracted from the extraction part 121 according to the number of times in which the dictionary data is selected. For example, the alignment part 122 aligns the extracted dictionary data according to the number of times in which the dictionary data is selected in a descending order (i.e., sorted in an order from the largest value of the selected number of times to the smallest value of the selected number of times).

When the conversion candidate is selected from the list of conversion candidates displayed by the display control part 112, the update part 123 updates the number of times in which the dictionary data corresponding to the selected conversion candidate is selected. For example, the update part 123 adds "1" to the value of the number of times of selecting the dictionary data including the word that is indicated by the conversion candidate selected from the list of conversion candidates, and updates the dictionary data stored in the dictionary DB 200.

Figure 6:
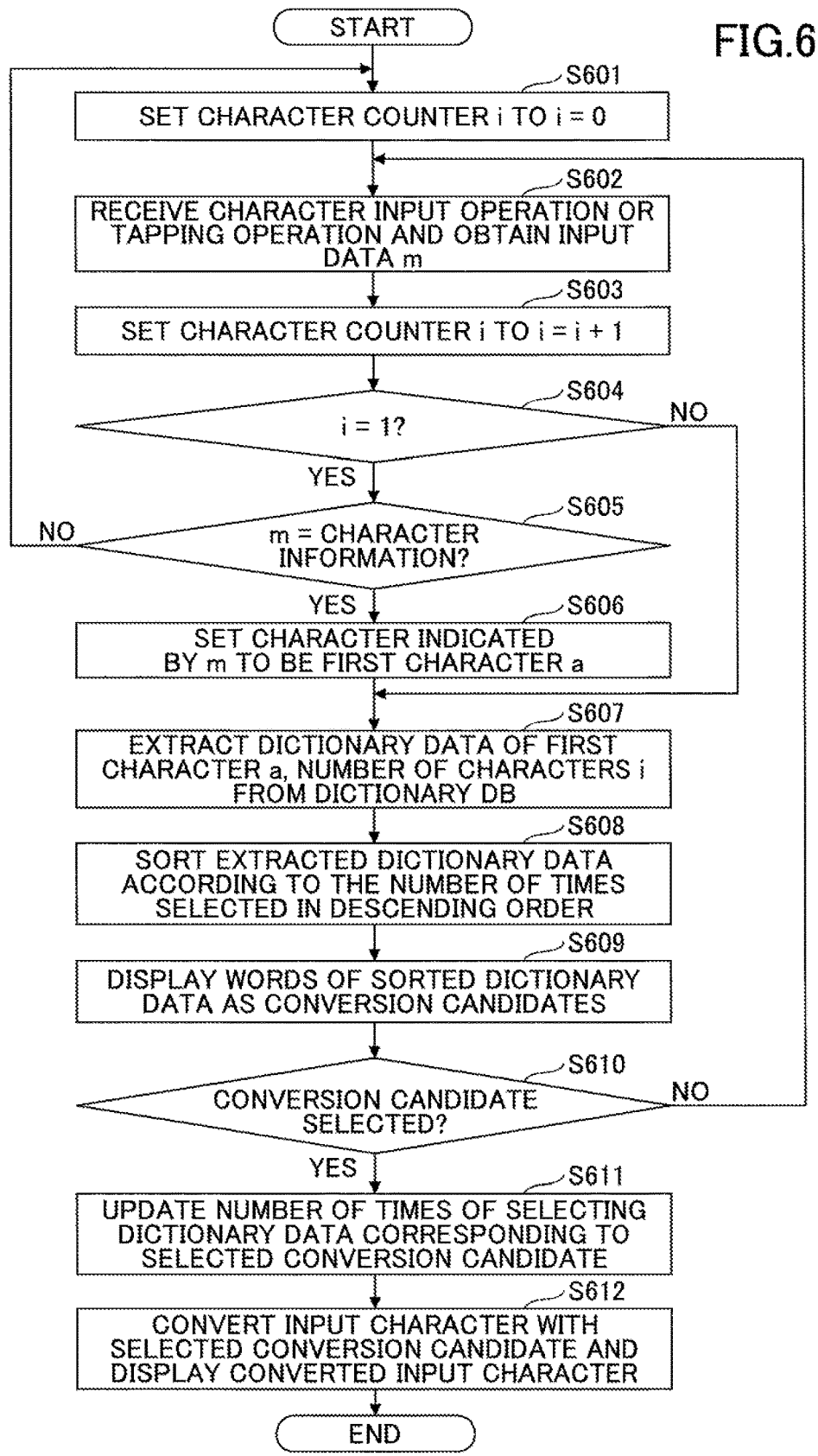
FIG. 6 is a flowchart of a character input process according to the first embodiment of the present invention.

Next, the character input process of the terminal device 10 of the first embodiment is described in further detail with reference to FIG. 6. FIG. 6 is a flowchart illustrating an example of the character input process of the first embodiment.

First, the input/output part 110 sets the value of the character number counter "i" to 0 for counting the number of times in which input information is obtained (i.e., counting the number of times of receiving the character input operation and the character number input operation) (Step S601).

Then, the input/output part 110 obtains input information "m" by receiving a character input operation or a tapping operation byway of the input reception part 111 (Step S602). That is, in a case where the input reception part 111 receives a character input operation, the input information m obtained by the input reception part 111 is character information indicating the characters input by the character input operation. Further, in a case where the input reception part 111 receives a tapping operation (character number input operation), the input information m obtained by the input reception part 111 is tapping information indicating the number of characters input by the tapping operation.

In Step S602, the character input operation is not limited to inputting characters by hand. For example, the character input operation may include character input by using a software keyboard or character input by voice recognition.

Figure 7:
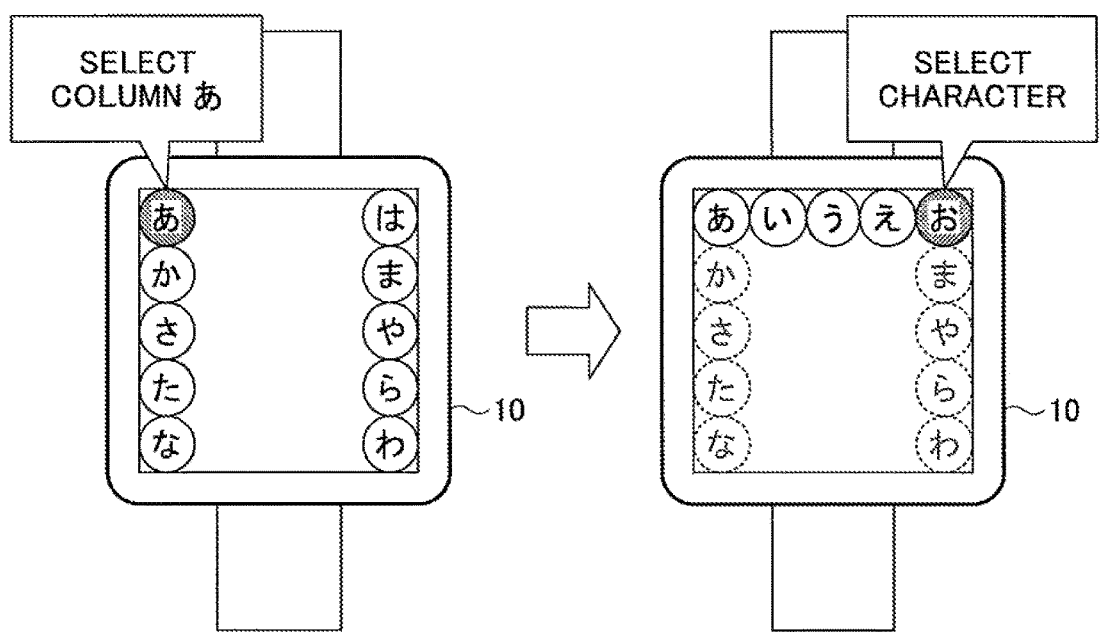
FIG. 7 is a schematic diagram illustrating an operation of inputting a character by using a software keyboard.

An example of a character input operation using a software keyboard is illustrated in FIG. 7. FIG. 7 is a schematic diagram illustrating the example of the character input operation using a software keyboard.

For example, in a case of performing an input operation for the character "お (O)", the column "あ (A)" including the character "お (O)" is selected from the software keyboard displayed on the display device 12 of the terminal device 10 as illustrated in FIG. 7. Then, the character "お (O)" is selected from the column "あ (A)" consisting of a group of characters "あ (A)", "い (I)", "う (U)", and "え (E)" displayed in response to the selection of the column "あ (A)". Thereby, the user can perform an input operation for the character "お (O)" by using the software keyboard.

Returning to the description of FIG. 6, the input/output part 110 adds "1" to the character number counter i after Step S602 (Step S603). That is, the input/output part 110.

That is, when the input/output part 110 receives input information m from the input reception part 111, the input/output part 110 set the value of the character number counter i to "i+1". Accordingly, whenever input information m is obtained, the input/output part 110 adds (increments) to the character number counter. Thereby, the number of characters can be counted.

Then, the input/output part 110 determines whether the value of the character number counter i is "1" (Step S604).

In a case where the value of the character number counter i is determined to be "1" in Step S604, the input/output part 110 determines whether the input information "m" obtained by the input reception part 111 in Step S602 is character information (Step S605). That is, the input/output part 110 determines whether the character input operation is received by the input reception part 111 in Step S602.

In a case where the value of the character number counter i is determined as not being "1" in Step S604, the character input process unit 100 proceeds to the process of Step S607.

In the case where the input information m is determined to be character information in Step S605, the input/output part 110 assumes that the first character "a" is a character indicating the input information m (Step S606).

On the other hand, in the case where the input information m is determined as not being character information in Step S605, the character input process unit 100 returns to the process of Step S601. That is, in a case where an operation other than the character input operation (e.g., tapping operation, swiping operation, flicking operation) is received by the input reception part 111 in Step S602, the character input process unit 100 returns to the process of Step S601. Note that, the "operation other than the character input operation" may also include an operation that is performed when a character could not be recognized by hand input or voice recognition input.

Then, the candidate extraction part 120 extracts dictionary data including the first character "a" and the character number (number of characters) "i" from the dictionary data stored in the dictionary DB 200 (Step S607).

When the first character is input by the user, the value of the character number character i becomes "1". Accordingly, the candidate extraction part 120 extracts the dictionary data including the first character and the character number "1" from the dictionary DB 200. Then, the candidate extraction part 120 extracts the dictionary data including the first character and the character number sequentially added with "1" from the dictionary DB 200 whenever a tapping operation is received. That is, the candidate extraction part 120 extracts the dictionary data including the character input operation and the number of times of receiving the tapping operation from the dictionary DB 200.

Then, the candidate extraction part 120 aligns (sorts) the dictionary data extracted from the dictionary DB 200 by way of the alignment part 122 (Step S608). The dictionary data is sorted based on, for example, the number of times in which characters are selected in a descending order.

The processes in Steps S607 and S608 are described in further detail with reference to FIG. 8. FIG. 8 is a schematic diagram illustrating an example of extracting dictionary data and aligning the dictionary data.

For example, in a case where the first character "a" is "お (O)" and the number of characters "i" is "4", the extraction part 121 extracts dictionary data from the dictionary DB 200 (Step S607) in which the extracted data item "first character" is the data value "お (O)" and the data item "number of characters" is "4" as illustrated in FIG. 8. Then, the alignment part 122 aligns (sorts) the dictionary data extracted by the extraction part 121 according to the data item "number of times selected" in a descending order.

The alignment part 122 is not limited to sorting the dictionary data according to the data item "number of times selected" in a descending order. For example, the alignment part 122 may sort the dictionary data according to the time/date in which the word included in the dictionary data was input (order beginning from newest input). Thereby, a list of conversion candidates can be displayed in an order beginning from the newest input date.

Returning to the description of FIG. 6, the input/output part 110 displays the list of words included in the aligned dictionary data (list of conversion candidates) byway of the display control part 112 after Step S608 (Step S609). That is, the display control part 112 displays a list of characters or character strings (words) that are the data values of the date item "words" of the aligned dictionary data (list of conversion candidates).

Thus, according to the terminal device 10 of the first embodiment, a list of conversion candidates can be displayed whenever a character input operation or a character number input operation is performed on the terminal device 10. That is, when a first character is input to the terminal device 10 of the first embodiment, the terminal device 10 displays a list of conversion candidates based on the input first character and the number of characters "1". Then, each time a tapping operation (inputting of the number of characters) is performed on the terminal device of the first embodiment, a list of conversion candidates is displayed based on the first character and the number of characters derived by sequentially adding "1" to the number of characters (i.e., based on the number of times in which the character input operation and the tapping operation are performed). Then, the input/output part 110 waits for a conversion candidate to be selected from the list of conversion candidates by way of the input reception part 111 (Step S610). That is, the input reception part 111 waits for receiving a selection operation in which a conversion candidate is selected from the list of conversion candidates.

In a case where an operation other than the selection operation for selecting a conversion candidate from the list of conversion candidates is performed in Step S610, the character input control unit 100 returns to the process of Step S602. That is, in a case where the input reception unit 111 receives, for example, a character number input operation (tapping operation), the character input control unit 100 returns to the process of Step S602.

In a case where the selection operation for selecting a conversion candidate from the list of conversion candidates is performed in Step S610, the candidate extraction part 120 updates the number of times in which the dictionary data corresponding to the selected conversion candidate is selected by way of the update part 123 (Step S611). That is, the update part 123 updates the dictionary data stored in the dictionary DB 200 by adding "1" to the data value of the data item "number of times selected" of the dictionary data including the word indicated by the conversion candidate selected from the list of conversion candidates.

Then, the input/output part 110 converts the first character with the selected conversion candidate and displays the conversion candidate by way of the display control unit 112. Thereby, the word indicated by the conversion candidate selected by the user can be input.

Hence, according to the terminal device 10 of the first embodiment, the user can display the list of conversion candidates by inputting the first character of the word desired to be input (character input operation) and tapping the terminal device 10 according to the number of characters of the desired word (tapping operation).

Thereby, according to the terminal device 10 of the first embodiment, the user can input the desired word by inputting only a few characters. Therefore, the possibility of inputting an erroneous word can be reduced by using the terminal device 10 of the first embodiment. Thus, the terminal device 10 of the first embodiment increases the efficiency of character input.

Note that, in a case where the value of the character number counter "i" is greater than or equal to 1, the input/output part 110 adds "1" to the character number counter i in Step S603 when the input reception part 111 obtains character information as the input information m in Step S602. That is, in a case where, for example, one character is input after the first character is input, "1" is added to the value "1" of the character number counter "i" in Step S603.

Alternatively, in a case where the value of the character number counter "i" is greater than or equal to 1, the input/output part 110 may set the character number counter "i" to be "1" when the input reception part 111 obtains character information as the input information m in Step S602. Thereby, in a case where characters are consecutively input, the last (most recent) input character can be assumed as the first character.

Alternatively, when the input reception part 111 obtains character information as the input information "m" in Step S602 in a case where the value of the character number counter "i" is greater than or equal to 1, the candidate extraction part 120 may obtain dictionary data based on the obtained character information and character information that has been already obtained. More specifically, in a case where the character "あ (A)" is input when the character number counter is "i=0" and the character "く (KU)" is input when the character number counter is "i=1", the candidate extraction part 120 may assume that the first character counted from the beginning of a word is "あ (A)" and the second character counter from the beginning of the word is "く (KU)" and extract dictionary data consisting of two characters (character number "2") from the dictionary DB 200. Thereby, in a case where the tapping operation is performed "M" ("M" being an integer greater than or equal to 0) times after a character is consecutively input "N" ("N" being an integer greater than or equal to 2), the "N" characters at the beginning of the word are assumed to be the input characters, and dictionary data consisting of "N+M" characters are extracted from the dictionary DB 200.

Although the first embodiment is described by illustrating a case where a list of conversion candidates is displayed based on the first character input in Japanese Hiragana characters and the number of characters, the first embodiment is not limited to this case. For example, the first embodiment may also be applied to a case where alphabet letters, Japanese Katakana characters, or Chinese characters are input.

Figure 9:
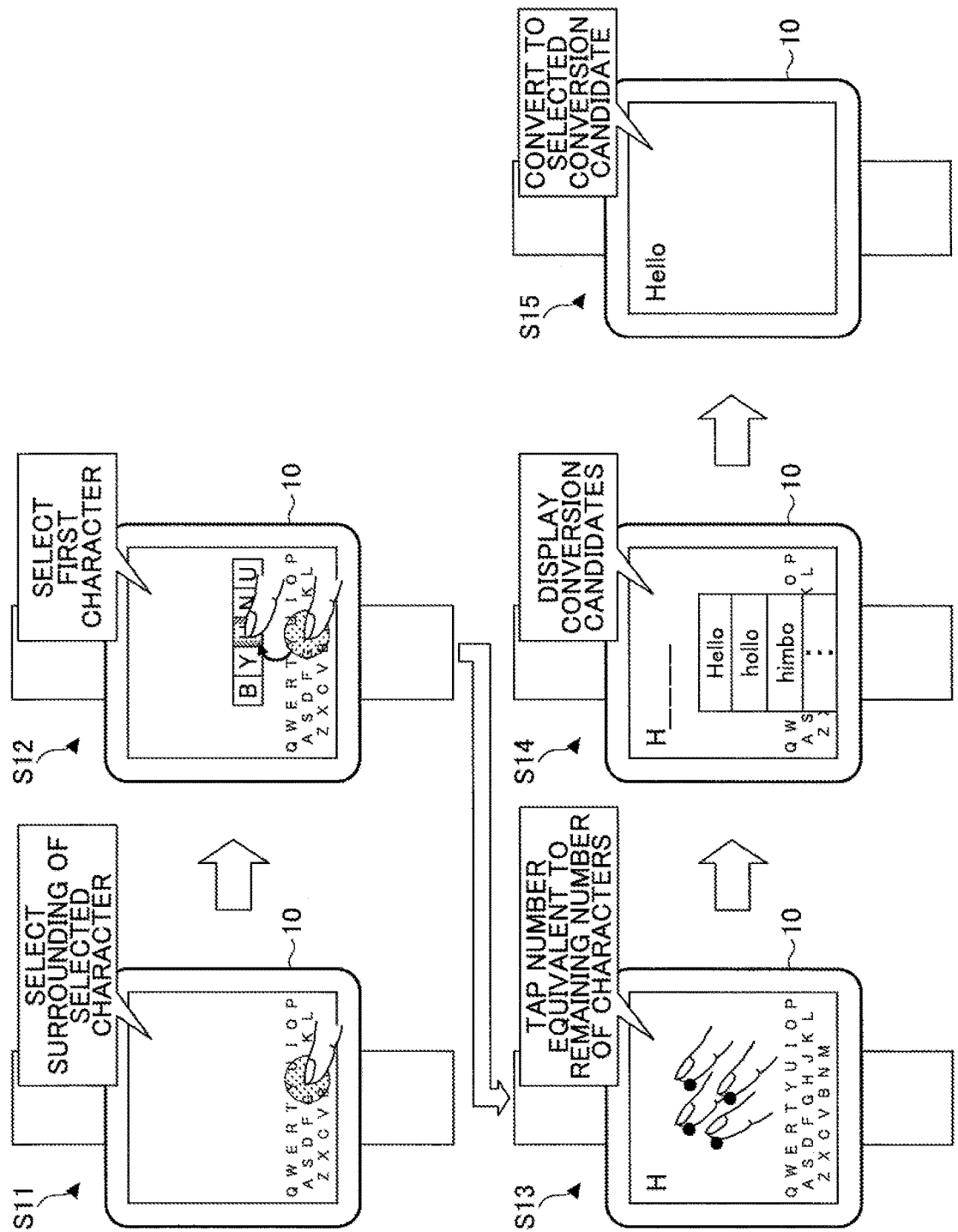
FIG. 9 is a schematic diagram illustrating an applied example of alphabet input.

Next, a modified example is described with reference to FIG. 9. In the modified example, an alphabet character is input as the first character. FIG. 9 is a schematic diagram illustrating a modified example in which alphabet letters are input. A case where the user desires to input the word "Hello" is described as an example of the modified example.

First, the terminal device 10 receives an operation of selecting a first character (first character selection operation) performed on the software keyboard displayed on the display device 12 by way of the input/output part 110 (Step S11). That is, an area that surrounds a character desired to be input as the first character is selected, and the selection is received by the input/output part 110. Accordingly, a group of characters (character group) located within a predetermined range of the selected area can be selectively displayed on the display device 12 of the terminal device 10 by way of the input/output 110.

Then, the terminal device 10 receives an input operation of selecting the first character from the displayed character group byway of the input/output part 110 (Step S12). That is, the input/output part 110 receives an input operation of the first character "H" of the word "Hello" desired to be input by the user.

Then, the terminal device 10 receives an input operation of the number of characters (character number input operation) by way of the input/output part 110 (Step S13). Similar to the above-described embodiment, the character number input operation may be performed by a tapping operation.

In this modified example, the user may tap the terminal device 10 in a number equivalent to the remaining number of characters excluding the first character "H" from the word "Hello" (i.e., four characters "e", "l", "l" and "o"). That is, the user taps the terminal device 10 four times.

Then, the terminal device 10 extracts dictionary data from the dictionary DB 200 based on the first character and the number of characters by way of the candidate extraction part 120. Then, the terminal device 10 displays a list of conversion candidates indicating the words included in the extracted dictionary data (Step S14).

That is, the candidate extraction part 120 extracts dictionary data including the first character "H" and the number of characters "4" from the dictionary data stored in the dictionary DB 200. Then, the input/output part 110 displays a list of conversion candidates indicating the words included in the extracted dictionary data.

Finally, the terminal device 10 converts the first character into the conversion candidate selected from the list of conversion candidates by the user by way of the input/output part 110 (Step S15).

Accordingly, the word "Hello" is displayed on the terminal device 10 when the user selects the conversion candidate "Hello" from the list of conversion candidates. That is, the word "Hello" is input to the terminal device 10.

Accordingly, the terminal device 10 of the first embodiment can also be applied to a case where the user desired to input a word in English. Note that the first embodiment is not limited to a case of inputting English. For example, the terminal device 10 of the first embodiment can also be applied to a case of inputting words expressed in other various languages such as Chinese, Korean, German, and French.

In addition, the terminal device 10 of the first embodiment is not limited to a wearable terminal such as a smart watch. For example, the terminal device of the first embodiment may also be applied to, for example, a smartphone or a tablet terminal.

Figure 10:
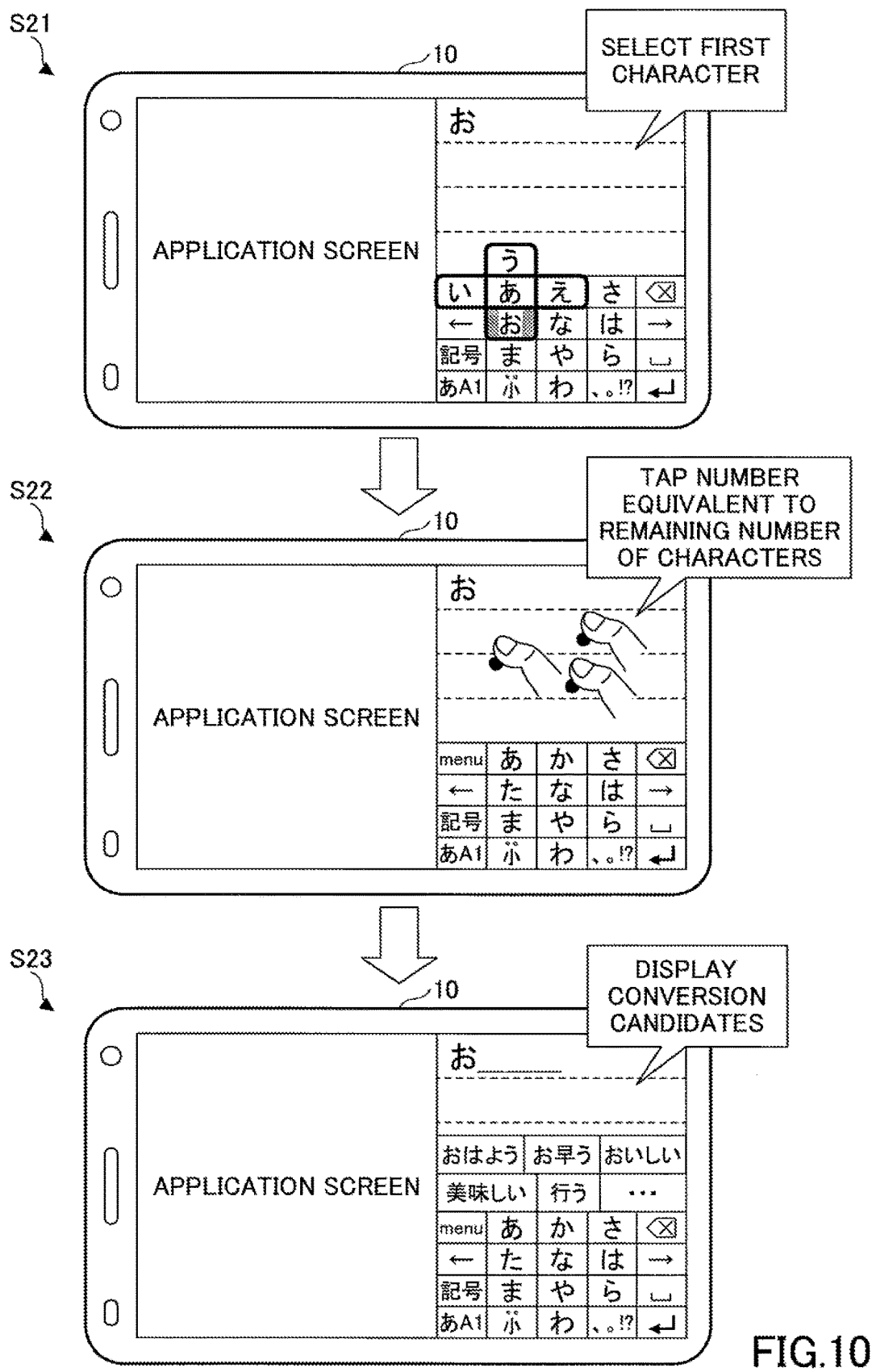
FIG. 10 is a schematic diagram illustrating an applied example for a smartphone.

Next, another modified example is described with reference to FIG. 10. FIG. 10 is a schematic diagram illustrating the modified example in which the terminal device 10 is a smartphone.

First, the terminal device 10 receives an operation of selecting a first character (first character selection operation) performed on the software keyboard displayed on the display device 12 by way of the input/output part 110 (Step S21). Note that, the software keyboard is displayed in a relatively small area compared to the entire display area because an application screen is displayed on the display device 12 as illustrated in FIG. 10.

Then, the terminal device 10 receives an operation of inputting the number of characters (character number input operation) by way of the input/output part 110.

Note that a particular display area may be displayed on the display device 12 of the terminal device 10 for receiving the character number input operation. By displaying the particular display area, an unintended process can be prevented from being executed in response to a character number input operation (tapping operation) performed on the display area of the software keyboard or the application screen.

Then, the terminal device 10 extracts dictionary data from the dictionary DB 200 based on the first character and the number of characters by way of the candidate extraction part 120. Then, the terminal device 10 displays a list of conversion candidates indicating the words included in the extracted dictionary data by way of the input/output part 110 (Step S23).

Accordingly, the first embodiment can also be applied in a case where the terminal device 10 is, for example, a smartphone or a tablet terminal. Thus, high character input efficiency can be achieved particularly in a case where an input area of, for example, a software keyboard of the terminal device 10 is relatively small compared to the entire display area of the terminal device 10.

Second Embodiment

Next, the second embodiment of the present invention is described. According to the terminal device 10 of the second embodiment, the list of conversion candidates is displayed based on not only the first character and number of characters but also the last character of the word desired to be input by the user. In the second embodiment, like parts and processes are denoted with like reference numerals as those of the first embodiment and are not described in further detail.

Figure 11:
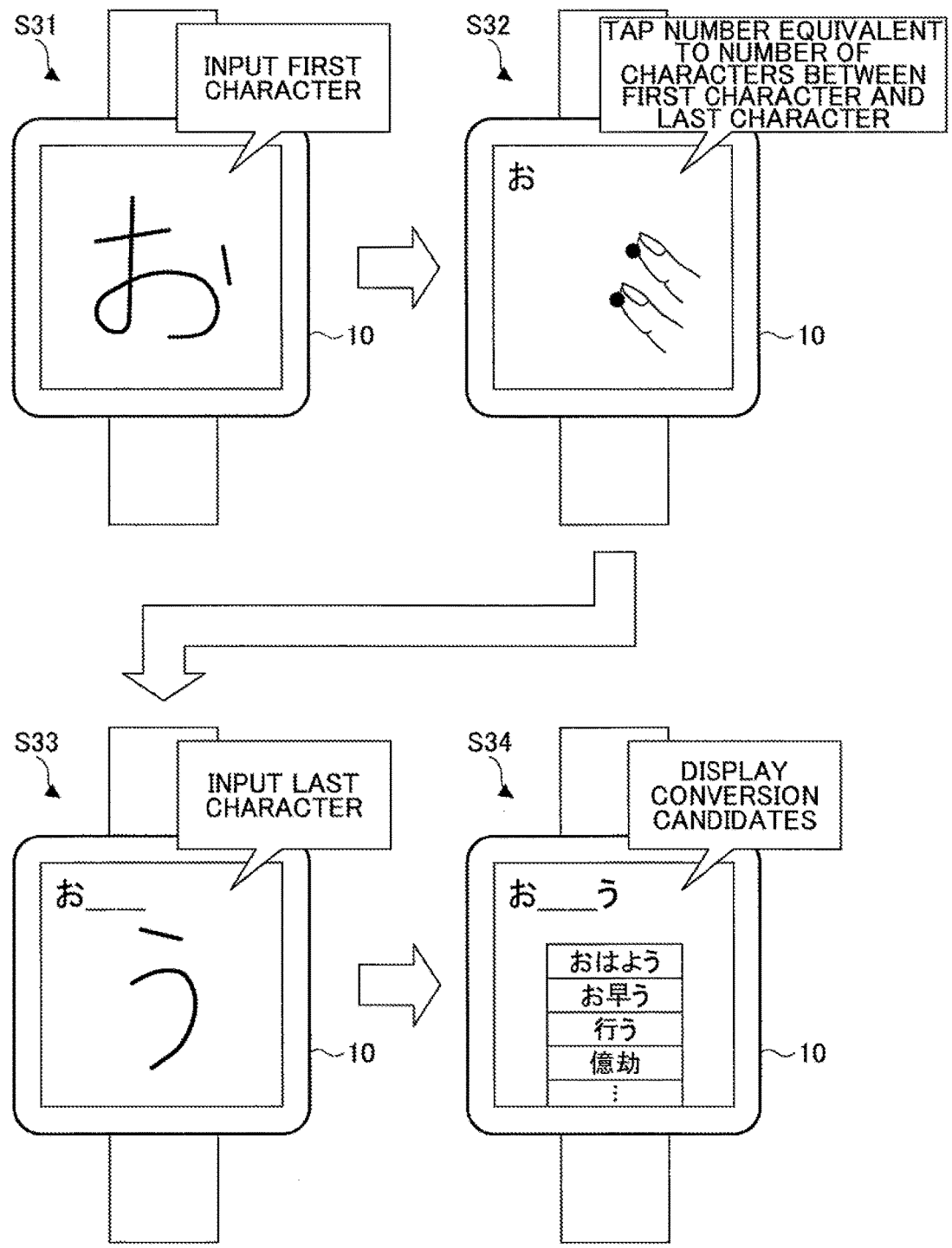
FIG. 11 is a schematic diagram for describing a character input process according to the second embodiment of the present invention.

First, a character input process of the second embodiment is described with reference to FIG. 11. FIG. 11 is a schematic diagram for describing the character input process of the second embodiment.

The terminal device 10 receives input of a first character byway of the input/output part 110 (Step S31). That is, similar to the first embodiment, the user performs an input operation on the input/output part 110 by which the first character "お (O)" of the word "おはよう (O-HA-YO-U)" desired to be input is received.

Then, the terminal device 10 receives the input of the number of characters by way of the input/output part 110 (Step S32). In this embodiment, the number of taps by the user may be the number of characters excluding the first and last characters of the word desired to be input. That is, the user may tap the terminal device 10 in a number equivalent to the remaining number of characters excluding the first character "お (O)" and the last character "う (U)" from the word "おはよう (O-HA-YO-U)" (i.e., two characters "は (HA)" and "よ (YO)").

Then, the terminal device 10 receives input of the last character by way of the input/output part 110 (Step S33). That is, the user performs an input operation on the input/output part 110 by which the last character "う (U)" of the word "おはよう (O-HA-YO-U)" desired to be input is received.

Then, the terminal device 10 extracts, by way of the candidate extraction part 120, the dictionary data from the dictionary DB based on the first character, the number of characters, and the last character. Then, the terminal device 10 displays, by way of the input/output part 110, a list of conversion candidates indicating the words included in the extracted dictionary data (Step S34).

That is, the candidate extraction part 120 extracts dictionary data including a word having the character "お (O)" as its first character, consisting of four characters, and having the character "う (U)" as its last character. Then, the input/output part 110 displays a list of conversion candidates including the words included in the extracted dictionary data. The reason that the number of characters is "four" is because the number of tapping operations performed on the terminal device 10 after the input of the first character "お (O)" is two times (input operations performed in a number equivalent to two characters) and the last character "う (U)" is input after tapping the terminal device 10 two times.

Finally, the terminal device 10 converts, byway of the input/output part 110, the first and last characters into a conversion candidate selected from the list of conversion candidates by the user (Step S35). Accordingly, when the user selects the conversion candidate "おはよう (O-HA-YO-U)" from the list of conversion candidates, the word "おはよう (O-HA-YO-U)" is displayed on the terminal device 10. That is, the word "おはよう (O-HA-YO-U)" is input to the terminal device 10.

Hence, according to the terminal device 10 of the second embodiment, the list of conversion candidates is displayed based on the first and last characters of the word desired to be input by the user and the number of characters of the desired word. Therefore, with the terminal device 10 of the second embodiment, a desire word can be input more easily, and the efficiency of character input can be improved.

Figure 12:
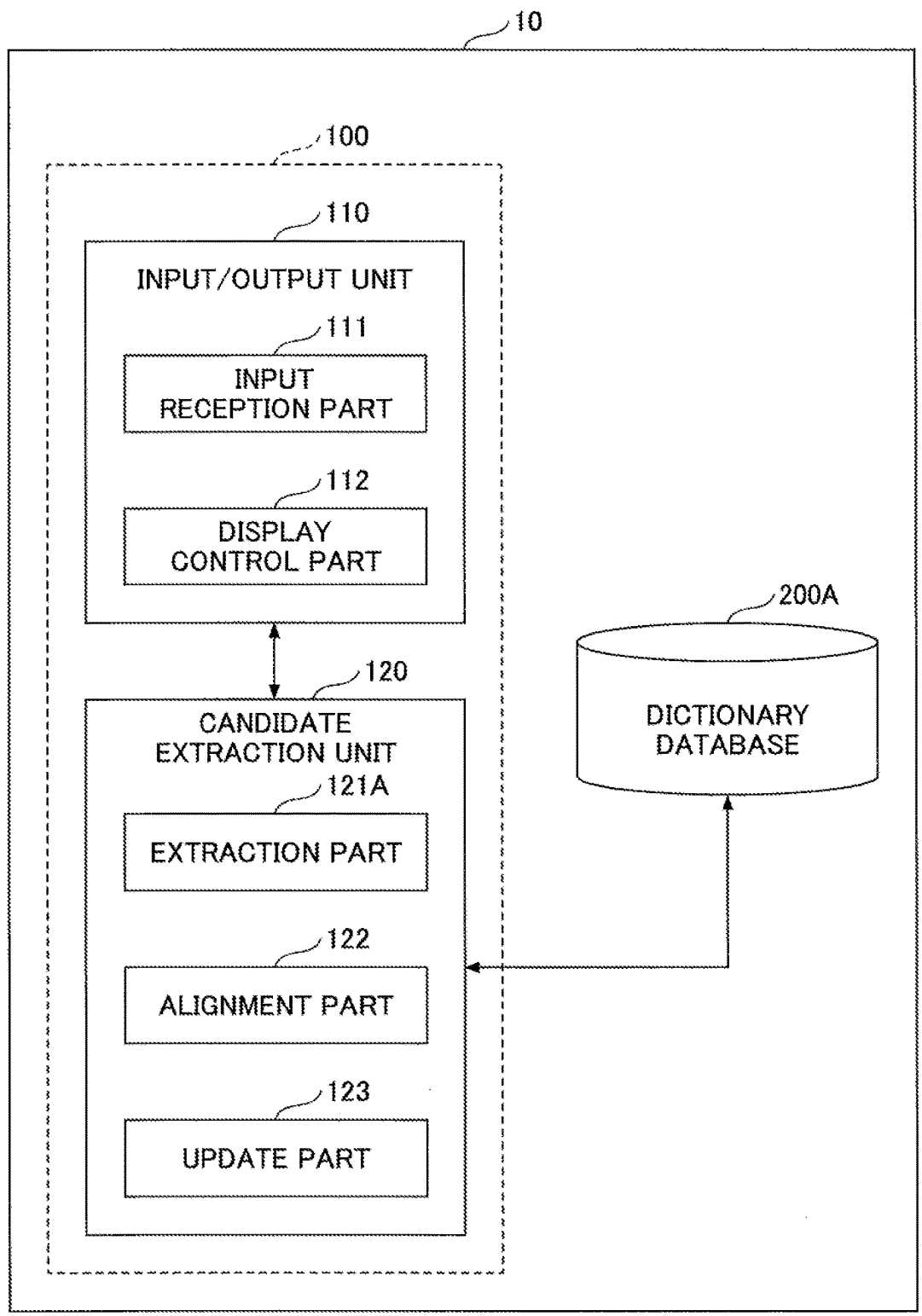
FIG. 12 is a schematic diagram illustrating a functional configuration of a character input process unit according to the second embodiment of the present invention.

Next, a functional configuration of the character input process unit 100 of the second embodiment is described in detail with reference to FIG. 12. FIG. 12 is a schematic diagram illustrating the functional configuration of the character input process unit 100 of the second embodiment. Note that the functions (functional parts) of the character input process unit 100 are implemented by the CPU 15 that executes the processes according to the one or more programs installed in the terminal device 10.

As illustrated in FIG. 12, the candidate extraction unit 120 includes an extraction part 121A. The extraction part 121A extracts dictionary data from a dictionary DB 200A based on the input information obtained by the input reception part 111. That is, the extraction part 121A extracts, from the dictionary DB 200A, dictionary data that includes the first and last characters indicating the character information obtained by the input reception part 111 and the number of characters indicating the number of times the input information is obtained by the input reception part 111.

Next, a data configuration of the dictionary data stored in the dictionary DB 200A of the second embodiment is described with reference to FIG. 13. FIG. 13 is a schematic diagram illustrating the data configuration of the dictionary DB 200A of the second embodiment. Note that the dictionary DB 200A can be implemented by using, for example, the ROM 14.

As illustrated in FIG. 13, the dictionary data stored in the dictionary DB 200A includes items such as, "last character" in addition to "word", "pronunciation", "first character", "number of characters", and "number of times selected". The item "last character" is a last character of the "pronunciation". The dictionary DB 200A stores dictionary data in association with each of these items.

Accordingly, because the dictionary data stored in the dictionary DB 200A of the second embodiment includes items such as, "last character" in addition to "word", "pronunciation", "first character", "number of characters", and "number of times selected", the terminal device 10 of the second embodiment can extract dictionary data from the dictionary DB 200A based on the first character, the number of characters, and the last character.

Figure 14:
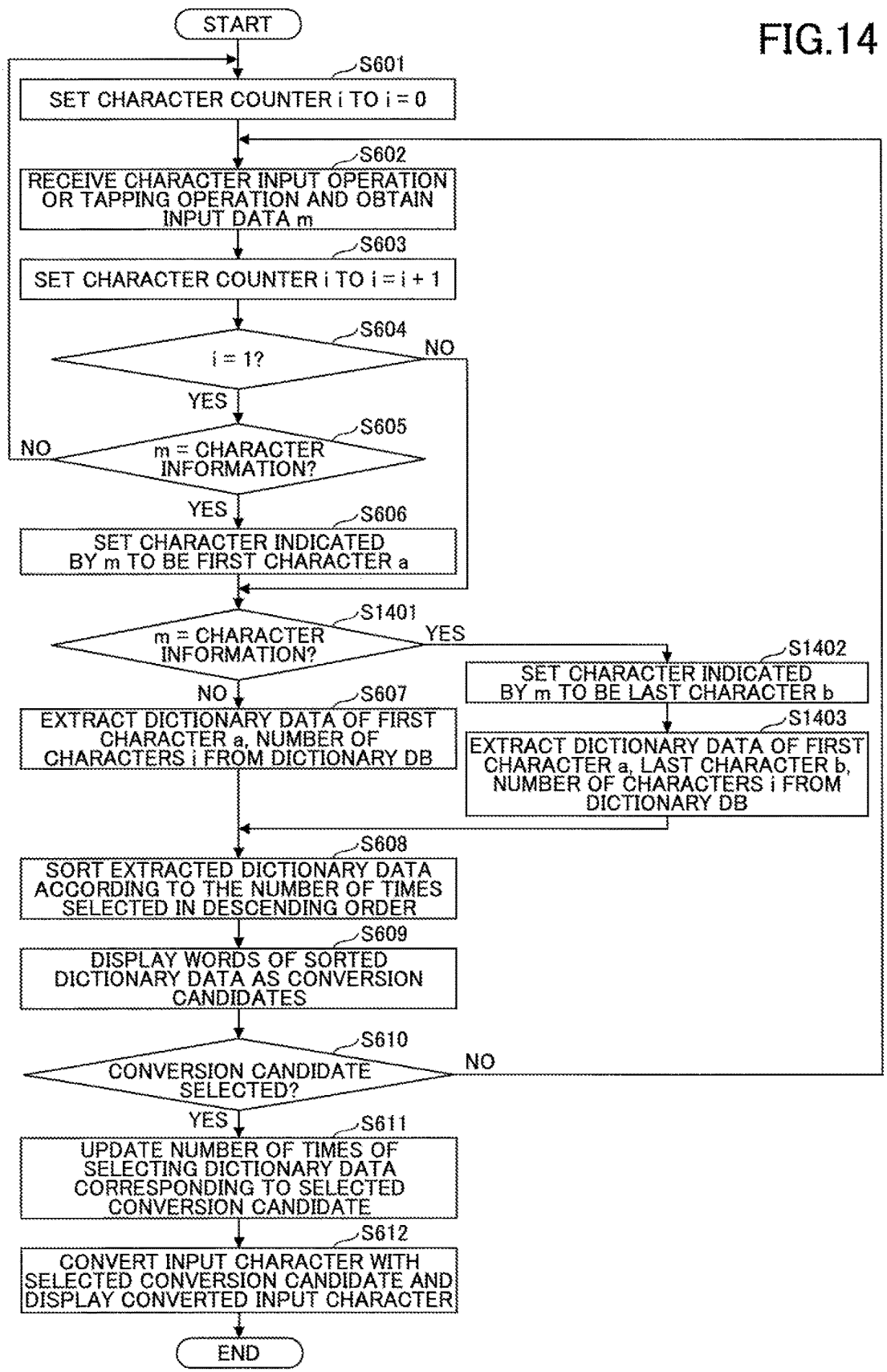
FIG. 14 is a flowchart of a character input process according to the second embodiment of the present invention.

Next, the character input process of the terminal device 10 of the second embodiment is described in further detail with reference to FIG. 14. FIG. 14 is a flowchart illustrating an example of the character input process of the second embodiment. Because steps S601 to S612 of FIG. 14 are the same as steps S601 to S612 of FIG. 6, further description thereof is omitted.

Following step S604 or S606 of FIG. 14, the input/output part 110 determines whether the input information "m" obtained by the input reception part 111 in Step S601 is character information (Step S1401). That is, the input/output part 110 determines whether the character input operation is received by the input reception part 111 in Step S602.

In a case where the input information m is determined to be character information in Step S1401, the input/output part 110 assumes that the last character "b" is a character indicating the input information m (Step S1402).

Then, the candidate extraction part 120 extracts, by way of the extraction part 121A, dictionary data including the first character "a", the last character "b", and the character number (number of characters) "i" from the dictionary data stored in the dictionary DB 200A (Step S1403).

On the other hand, in the case where the input information m is determined as not being character information in Step S1401, the character input process unit 100 returns to the process of Step S607.

Accordingly, the terminal device 10 of the second embodiment performs the same actions or processes as the terminal device 10 of the first embodiment whenever a tapping operation (i.e. operation of inputting the number of characters) is performed after the first character is input. Further, when the last character is input, a list of conversion candidates can be displayed, the terminal device 10 displays a list of conversion candidates based on the first character, the number of characters indicating the number of times of the character input operation and the tapping operation, and the last character.

Hence, according to the terminal device 10 of the second embodiment, a desired word can be input with few character input operations. In addition, the number of conversion candidates included in the displayed list of conversion candidates can be reduced by inputting the last character.

Thus, the terminal device 10 of the second embodiment enables easy input of, for example, a word in a case where a few characters counted from the first character of the word are the same as those of another word but the last character of the word is different from the last character of the other word. For example, the terminal device 10 of the second embodiment enables easy input of a specific word "特許異議申立書" in which the first number of characters "特許異議申立" are the same as those of another word "特許異議申立人" and the last character "書" of the specific word is different from the last character "人" of the another word.

Third Embodiment

Next, the third embodiment of the present invention is described. According to the terminal device 10 of the first and second embodiments, the character number input operation is described to be a tapping operation. The terminal device 10 of the third embodiment is described in a case where various character number input operations are performed on the terminal device 10. In the third embodiment, like parts and processes are denoted with like reference numerals as those of the first and second embodiments and are not described in further detail.

Figure 15:
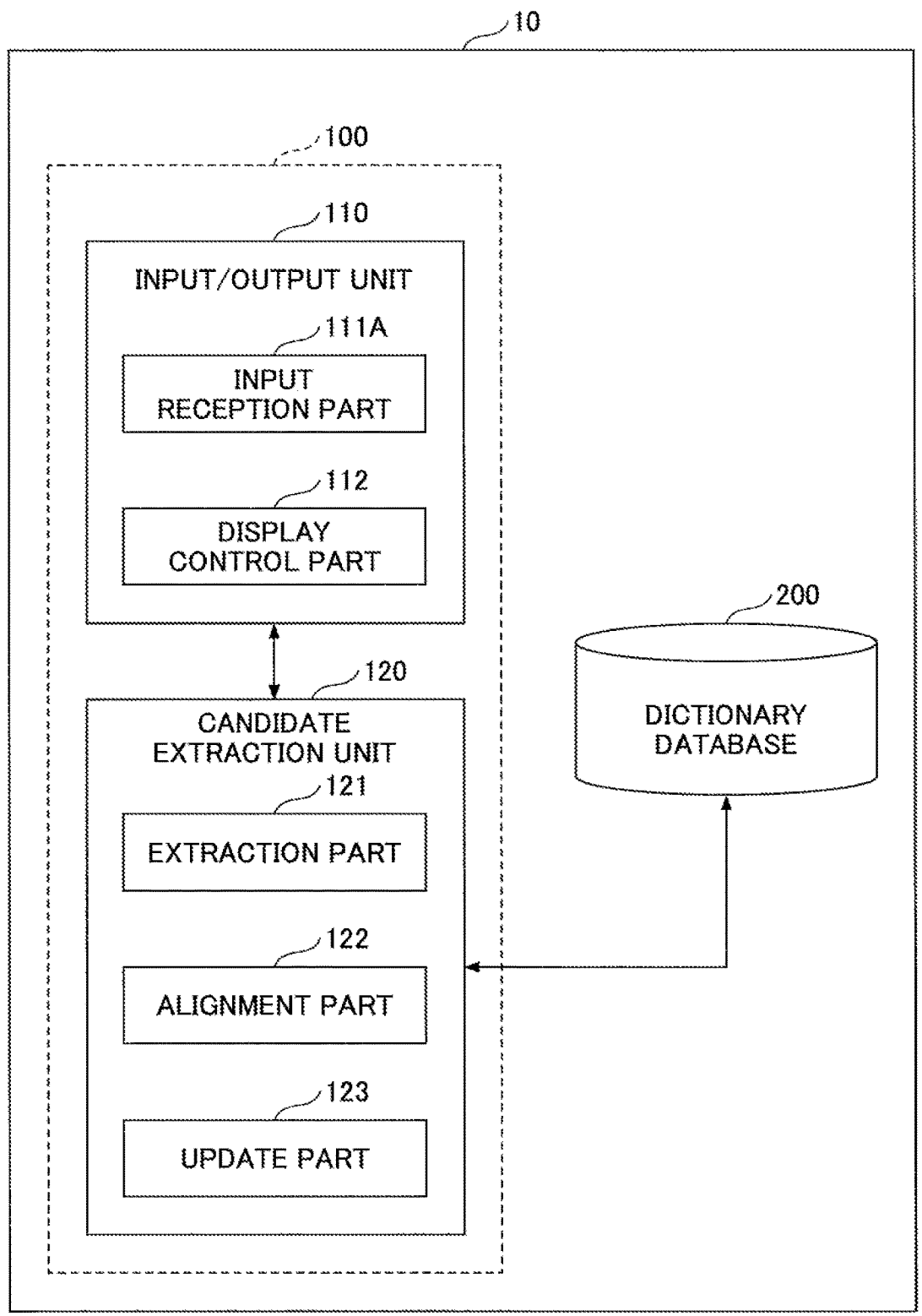
FIG. 15 is a schematic diagram for describing a character input process according to the third embodiment of the present invention.

A functional configuration of the character input process unit 100 of the third embodiment is described in detail with reference to FIG. 15. FIG. 15 is a schematic diagram illustrating the functional configuration of the character input process unit 100 of the third embodiment.

As illustrated in FIG. 15, the input/output part 110 of the third embodiment includes an input reception part 111A. The input reception part 111A receives various operations of the user and obtains input information. For example, the input reception part 111A receives various operations including the character number input operation and obtains input information.

The character number input operation received by the input reception part 111A is described below.

Figure 16:
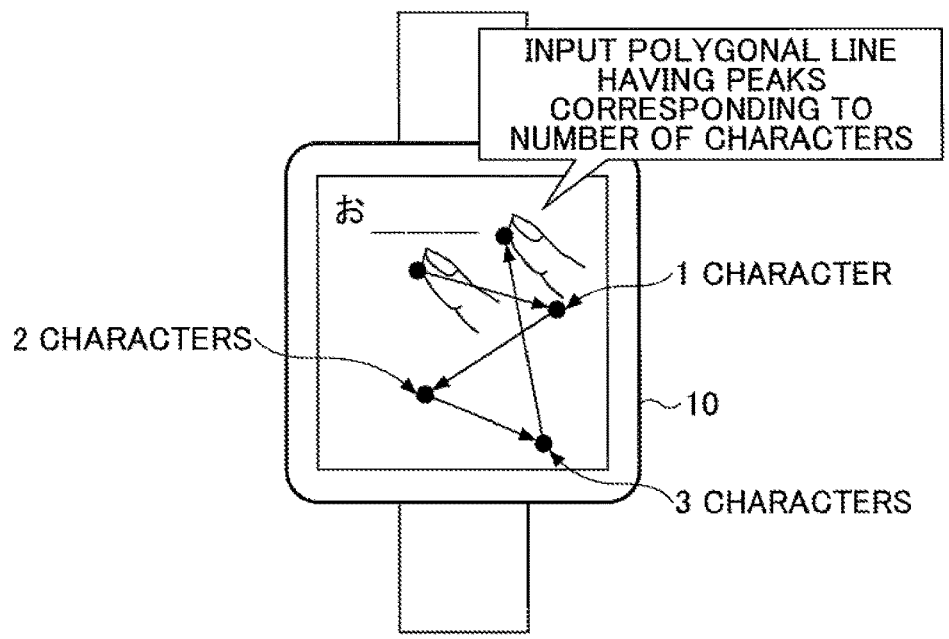
FIG. 16 is a schematic diagram illustrating a first part of an operation of inputting the number of characters according to an embodiment of the present invention.

With reference to FIG. 16, an operation of depicting a polygonal line (plural straight lines) is described as an example of the character number input operation. FIG. 16 is a schematic diagram illustrating the example of the character number input operation (part 1).

For example, in a case where the user desires to input a character number equivalent to three characters, the user depicts a polygonal line having three vertices as illustrated in FIG. 16. In this case, the input reception part 111A detects the vertices of the polygonal line depicted by the input operation and obtains input information m indicating the detection of the vertices. Accordingly, the terminal device 10 is to perform the processes on and after Step S603 of FIG. 6 whenever the input reception part 111A obtains input information m indicating the detection of the vertices. Note that the straight line included in the polygonal line may be input in an arbitrary direction such as a vertical direction, a lateral direction, or a diagonal direction.

Figure 17:
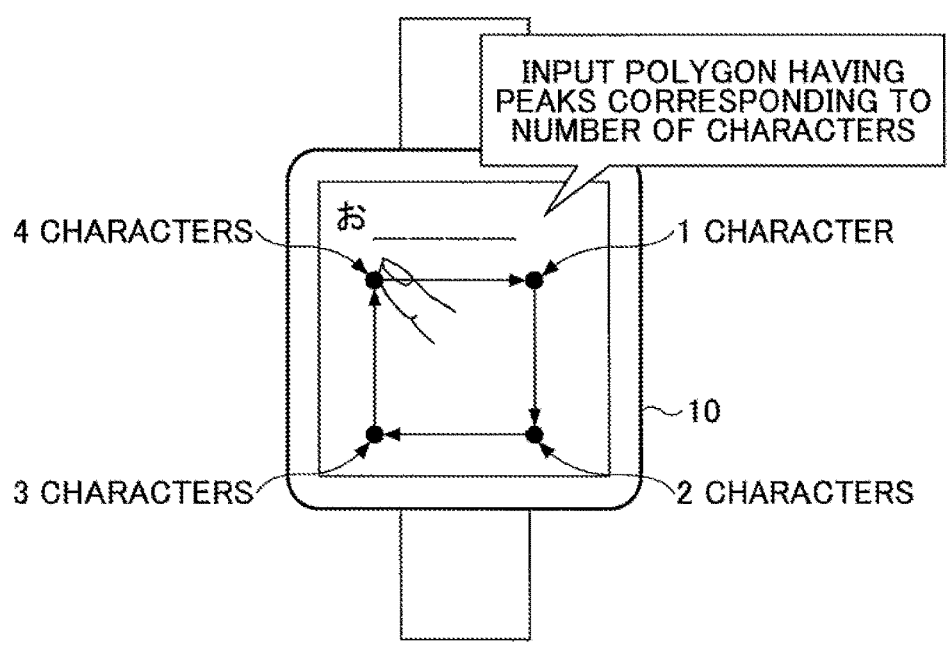
FIG. 17 is a schematic diagram illustrating a second part of the operation of inputting the number of characters according to an embodiment of the present invention.

Next, with reference to FIG. 17, an operation of depicting a polygon with a swiping operation is described as an example of the character number input operation. FIG. 17 is a schematic diagram illustrating the example of the character number input operation (part 2).

For example, in a case where the user desires to input a character number equivalent to four characters, the user depicts a polygon having four vertices (quadrangle) as illustrated in FIG. 17. In this case, the input reception part 111A detects the vertices of the polygon depicted by the input operation and obtains input information m indicating the detection of the vertices. Accordingly, the terminal device 10 is to perform the processes on and after Step S603 of FIG. 6 whenever the input reception part 111A obtains input information m indicating the detection of the vertices. Besides the quadrangle, the polygon may also be, for example, a triangle, a pentagon, or a hexagon. Further, the shape that is input by the input reception part 111A is not limited to a polygon. For example, the shape that is input by the input reception part 111A may be the shape of a star.

Figure 18:
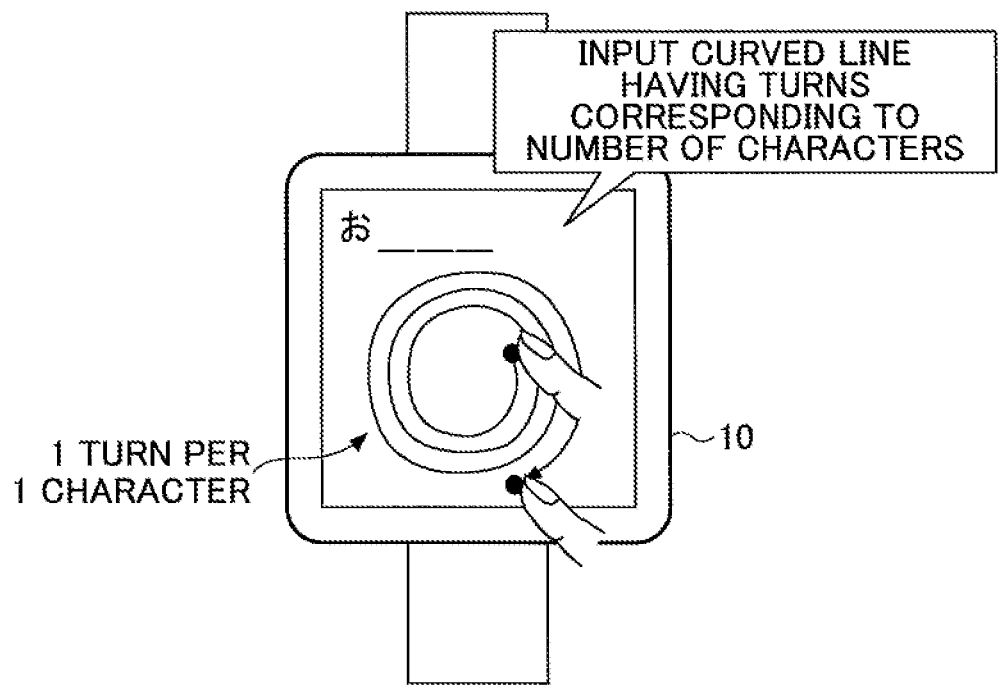
FIG. 18 is a schematic diagram illustrating a third part of the operation of inputting the number of characters according to an embodiment of the present invention.

Next, with reference to FIG. 18, an operation of depicting a spiral-like circle or a curved line with a swiping operation is described as an example of the character number input operation. FIG. 18 is a schematic diagram illustrating the example of the character number input operation (part 3).

For example, in a case where the user desires to input a character number equivalent to three characters, the user depicts a spiral curved line having three turns as illustrated in FIG. 18. In this case, the input reception part 111A detects that the spiral curve depicted by the input operation has rotated one time and obtains input information m indicating that the curve is rotated once. Accordingly, the terminal device 10 is to perform the processes on and after Step S603 of FIG. 6 whenever the input reception part 111A obtains input information m indicating the detection of the single rotation.

Figure 19:
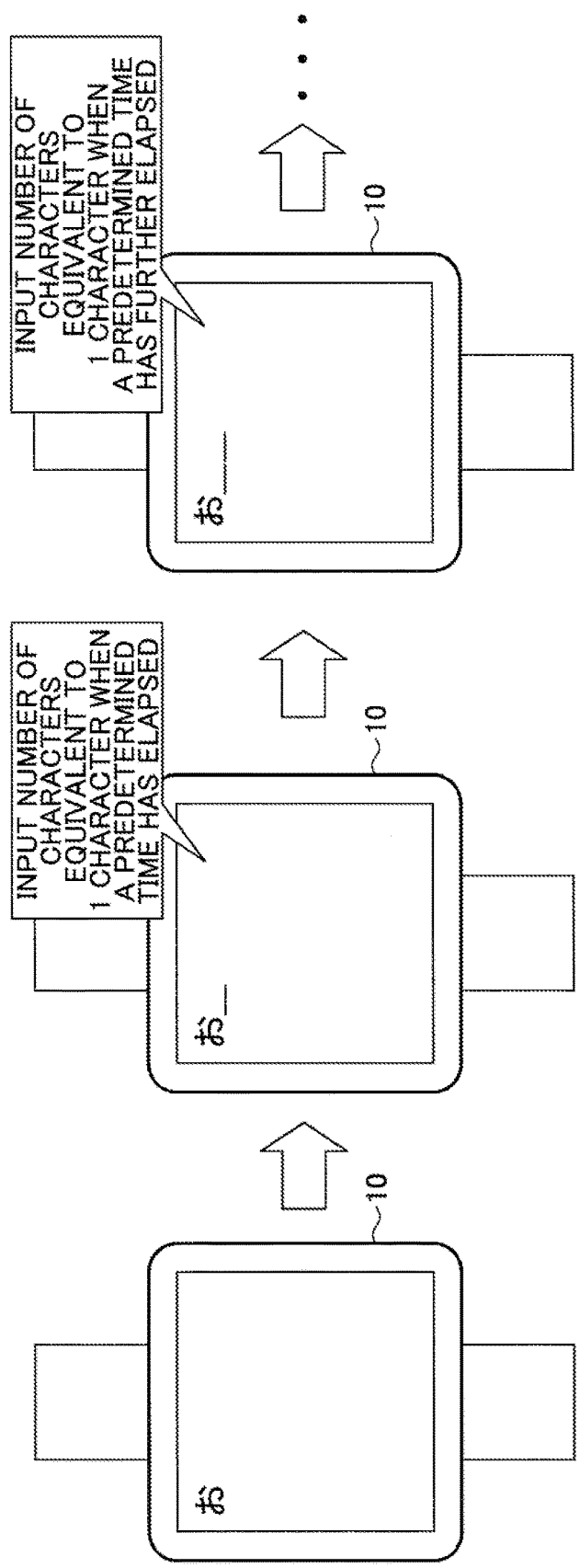
FIG. 19 is a schematic diagram illustrating a fourth part of the operation of inputting the number of characters according to an embodiment of the present invention.

Next, a case where the input reception part 111A obtains input information by not performing an input operation is described with reference to FIG. 19. FIG. 19 is a schematic diagram illustrating the example of the character number input operation (part 4).

As illustrated in FIG. 19, the input reception part 111A obtains input information m after a predetermined time has elapsed after the first character is input. In this case, the input information m that is obtained by the input reception part 19 indicates that the predetermined time has elapsed. Then, the input reception part 111A further obtains input information m after the predetermined time has elapsed. Similarly, the input information m that is obtained by the input reception part 111A indicates that the predetermined time has elapsed. In this manner, the input reception part 111A obtains input information m whenever the predetermined time elapses after the first character is input. Thus, the terminal device 10 need only to performed the process on and after Step S603 of FIG. 6 each time of obtaining the input information m indicating that the predetermined time has elapsed. Note that the "predetermined time" may be, for example, approximately 0.5 seconds to 1 second.

Hence, according to the terminal device 10 of the third embodiment, the character number input operation can be performed by various operations. Accordingly, the user can, for example, select a desired operation for inputting the number of characters from the various character number input operations.

Fourth Embodiment

The terminal device 10 according to the fourth embodiment is described in a case where the character input operation and the character number operation are performed with a predetermined UI (User Interface). In the fourth embodiment, like parts and processes are denoted with like reference numerals as those of the first and second embodiments and are not described in further detail.

Figure 20:
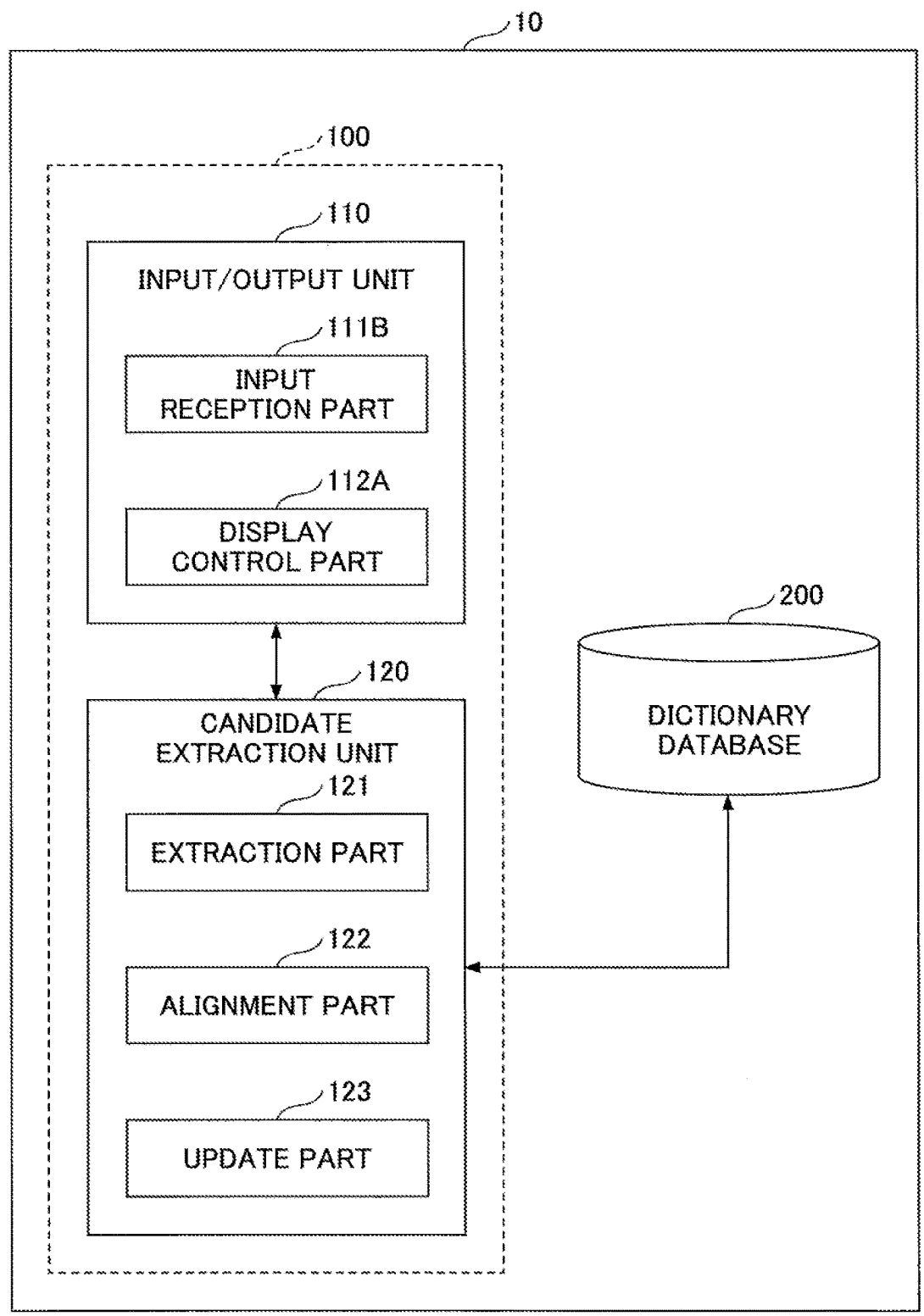
FIG. 20 is a schematic diagram illustrating a functional configuration of a character input process unit according to the fourth embodiment of the present invention.

Next, a functional configuration of the character input process unit 100 of the fourth embodiment is described in detail with reference to FIG. 20. FIG. 20 is a schematic diagram illustrating the functional configuration of the character input process unit 100 of the fourth embodiment. Note that the functions (functional parts) of the character input process unit 100 are implemented by the CPU 15 that executes the processes according to the one or more programs installed in the terminal device 10.

As illustrated in FIG. 20, the input/output part 110 includes an input reception part 111B and a display control part 112A. The display control part 112A displays a predetermined UI on the display device 12 for enabling the user to perform a character input operation and a character number input operation. The input reception part 111B obtains input information by receiving the character input operation and the character number input operation performed on the predetermined UI displayed by the display control part 112A.

Figure 21:
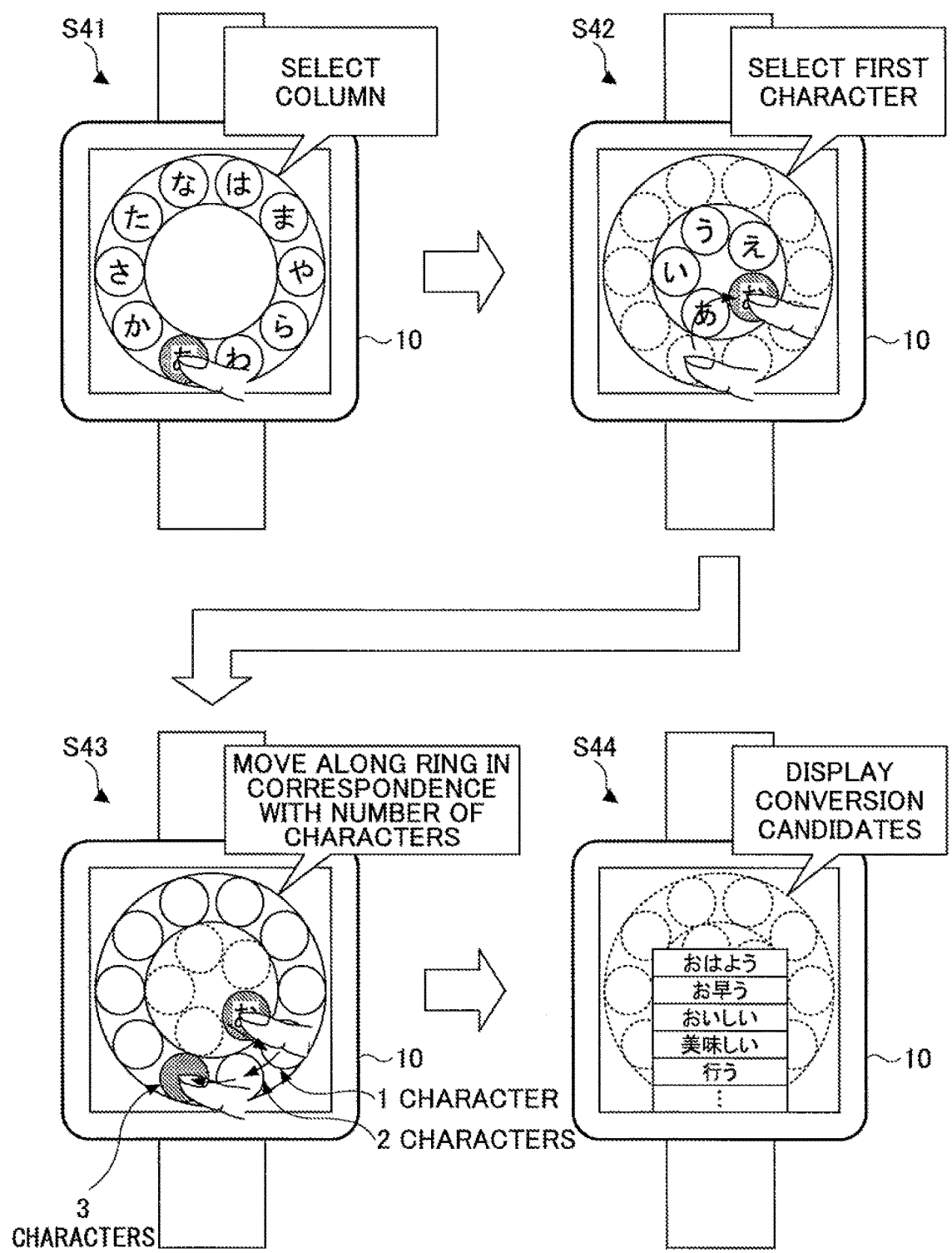
FIG. 21 is a schematic diagram for illustrating an operation of inputting the first character and the number of characters according to an embodiment of the present invention.

Next, the character input operation and the character number input operation performed on the predetermined UI displayed by the display control part 112A are described with reference to FIG. 21. FIG. 21 is a schematic diagram illustrating a character input operation and a character number input operation according to the fourth embodiment of the present invention.

The display device 12 of the terminal device 10 displays, by way of the display control part 112A, a UI on which a set of characters (e.g., Japanese Hiragana characters in columns "あ (A)", "か (KA)", . . . , and "わ (WA)" of the Japanese 50 syllable table) are arranged in a ring shape. When a user performs an operation of selecting, for example, a character indicating the column "あ (A)" in the case where Japanese Hiragana characters in columns "あ (A)", "か (KA)", . . . , and "わ (WA)" of the Japanese 50 syllable table) are arranged in a ring shape as illustrated in FIG. 21, the input reception part 111B receives the selection operation of the user (Step S41).

Then, the display control part 112A displays, on the display device 12, a UI that has each of character included in the selected column being arranged inside the ring shape. That is, the display control part 112A displays, on the display device 12, a UI that has the characters "あ (A)", "い (I)", "う (U)", "え (E)", and "お (O)" of the user-selected column of Step S41 arranged inside the ring shape. Then, when the user performs an operation of selecting, for example, the character "お (O)" as the first character, the input reception part 111B receives the selection operation (Step S42). Thereby, the input reception operation 111B obtains input information indicating the first character "お (O)".

Then, the user swipes the selected first character along the ring including Japanese Hiragana characters indicating the columns "あ (A)", "か (KA)", . . . , and "わ (WA)" of the Japanese 50 syllable table. The user may perform the swiping operation in, for example, in a clockwise direction or a counterclockwise direction. In response to the swiping operation, the input reception part 111B receives a character number input operation (Step S43). That is, whenever the swiping operation crosses over a position of each of the characters arranged in the ring shape, the input reception part 111B obtains input information indicating that the swiping operation has crossed over the position of the character.

Thus, when the first character "お (O)" is selected in Step S42 in a case where the user desires to input the word "おはよう (O-HA-YO-U)", the user swipes the first character along the ring shape in a manner that the selected first character crosses over the character indicating one or more columns of the Japanese syllable table in a number equivalent to three characters.

Then, the candidate extraction part 120 extracts dictionary data from the dictionary DB 200 based on the first character and the number of characters. Then, the display control part 112A displays a list of conversion candidates indicating the words included in the extracted dictionary data (Step S44).

Thus, according to the terminal device 10 of the fourth embodiment, the list of conversion candidates can be displayed by performing the first character and the number of characters by using the predetermined UI displayed on the display control part 112A. Accordingly, the user can input characters with high efficiency.

Hence, with the terminal device 10 of the above-described embodiments, character input can be performed with high efficiency.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A character input device comprising:
a memory that stores one or more input candidates; and
a processor that executes a process including
receiving input of a first character of a character string and followed by a number of characters of the character string,
extracting, from the one or more input candidates stored in the memory, an input candidate including a first item matching the first character and a second item matching the number of characters of the character string, and
displaying the extracted input candidate,
wherein the number of characters is input based on a tapping operation, an input operation of a polygonal line, an input operation of a polygon, or an input operation of a spiral curved line.

2. The character input device as claimed in claim 1,
wherein the memory stores the input candidate in association with a pronunciation of the input candidate, and
wherein when the first character and the number of characters are input to the character input device, the processor is configured to extract, from the one or more input candidates stored in the memory, the input candidate being associated with the pronunciation corresponding to the number of characters and including the first character.

3. The character input device as claimed in claim 1,
wherein when a second character of the character string is input to the character input device, the processor is configured to extract, from the one or more input candidates stored in the memory, the input candidate corresponding to the number of characters and including the first character and the second character as a last character of the character string according to the number of characters.

4. The character input device as claimed in claim 2,
wherein when a second character of the character string is input to the character input device, the processor is configured to extract, from the one or more input candidates stored in the memory, the input candidate being associated with the pronunciation corresponding to the number of characters and including the first character and the second character as a last character of the character string.

5. The character input device as claimed in claim 1,
wherein the process further includes aligning the one or more extracted input candidates in a predetermined order, and
wherein the displaying includes displaying the aligned one or more extracted input candidates.

6. A non-transitory computer-readable recording medium on which a program is recorded for causing a processor to execute a character input process, the character input process comprising:
receiving input of a first character of a character string and followed by a number of characters of the character string,
extracting, from one or more input candidates stored in a memory, an input candidate including a first item matching the first character and a second item matching the number of characters of the character string, and displaying the extracted input candidate, wherein the number of characters is input based on a tapping operation, an input operation of a polygonal line, an input operation of a polygon, or an input operation of a spiral curved line.

7. The non-transitory computer-readable recording medium as claimed in claim 6, wherein the character input process further comprises comprising storing the input candidate in association with a pronunciation of the input candidate in the memory, and wherein when the first character and the number of characters are input to the processor, the extracting includes extracting, from the one or more input candidates stored in the memory, the input candidate being associated with the pronunciation corresponding to the number of characters and including the first character.

8. The non-transitory computer-readable recording medium as claimed in claim 6, wherein when a second character of the character string is input to the processor, the extracting includes extracting, from the one or more input candidates stored in the memory, the input candidate corresponding to the number of characters and including the first character and the second character as a last character of the character string according to the number of characters.

9. The non-transitory computer-readable recording medium as claimed in claim 7, wherein when a second character of the character string is input to the processor, the extracting includes extracting, from the one or more input candidates stored in the memory, the input candidate being associated with the pronunciation corresponding to the number of characters and including the first character and the second character as a last character of the character string.

10. The non-transitory computer-readable recording medium as claimed in claim 6, wherein the character input process further comprises aligning one or more extracted input candidates in a predetermined order, wherein the displaying includes displaying the aligned one or more extracted input candidates.

* * * * *